United States Patent
Asterjadhi et al.

(10) Patent No.: US 10,660,130 B2
(45) Date of Patent: May 19, 2020

(54) CHANNEL ACCESS AND MEDIUM RESERVATION MECHANISM

(71) Applicant: QUALCOMM Incorporated, San Diego, CA (US)

(72) Inventors: Alfred Asterjadhi, San Diego, CA (US); George Cherian, San Diego, CA (US); Maarten Menzo Wentink, Nijmegen (NL); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/029,467

(22) Filed: Jul. 6, 2018

(65) Prior Publication Data
US 2019/0014599 A1   Jan. 10, 2019

Related U.S. Application Data

(60) Provisional application No. 62/530,011, filed on Jul. 7, 2017.

(51) Int. Cl.
*H04W 74/08* (2009.01)
*H04W 74/04* (2009.01)
(Continued)

(52) U.S. Cl.
CPC ... *H04W 74/0816* (2013.01); *H04W 72/0446* (2013.01); *H04W 74/04* (2013.01); *H04W 84/12* (2013.01); *H04W 84/18* (2013.01)

(58) Field of Classification Search
CPC ...................... H04W 74/0816; H04W 72/0446
See application file for complete search history.

(56) References Cited

U.S. PATENT DOCUMENTS 8,725,142 B1 * 5/2014 Schmalz ............... H04W 48/16
370/328
10,091,539 B1 * 10/2018 Kotian ............... H04N 21/2385
(Continued)

FOREIGN PATENT DOCUMENTS

GB           2511635 A        9/2014

OTHER PUBLICATIONS

International Search Report and Written Opinion—PCT/US2018/041154—ISA/EPO—dated Sep. 21, 2018.
(Continued)

*Primary Examiner* — Chi H Pham
*Assistant Examiner* — Fahmida S Chowdhury
(74) *Attorney, Agent, or Firm* — QUALCOMM Incorporated

(57) ABSTRACT

This disclosure provides systems, methods and apparatuses for coordinating access to a shared wireless medium among multiple master devices operating on the same frequency band. In some implementations, master devices may contend for access to the shared medium during a medium reservation window (MRW). During the MRW, master devices may advertise their intent to reserve at least a portion of the shared medium for one or more timeslots within a subsequent medium utilization period. The reservation messages may be broadcast to other master devices in the vicinity to prevent other master devices from accessing the wireless medium during a reserved timeslot. In some implementations, the owner of a timeslot may share at least a portion of its timeslot with other master devices. For example, the timeslot owner may enable other master devices to utilize an unused portion of the wireless medium, such as unused channels, spatial streams, or time.

26 Claims, 14 Drawing Sheets

(51) Int. Cl.
*H04W 72/04* (2009.01)
*H04W 84/12* (2009.01)
*H04W 84/18* (2009.01)

(56) References Cited

U.S. PATENT DOCUMENTS

| | | | |
|---|---|---|---|
| 2009/0201860 A1* | 8/2009 | Sherman | H04L 12/1881 370/329 |
| 2011/0211219 A1* | 9/2011 | Bradley | H04W 48/16 358/1.15 |
| 2013/0229988 A1* | 9/2013 | Ghosh | H04W 74/00 370/329 |
| 2013/0301438 A1* | 11/2013 | Li | H04W 4/90 370/252 |
| 2014/0126550 A1* | 5/2014 | Frederiks | H04W 74/085 370/336 |
| 2014/0376519 A1* | 12/2014 | Yang | H04W 74/0816 370/336 |
| 2015/0063327 A1* | 3/2015 | Barriac | H04W 56/0005 370/337 |
| 2016/0088441 A1* | 3/2016 | Mohammad Mirzaei | H04W 40/244 370/338 |
| 2016/0381706 A1* | 12/2016 | Huang | H04W 74/0808 370/329 |
| 2017/0055200 A1* | 2/2017 | Hassan | H04W 48/14 |

OTHER PUBLICATIONS

N/A, "Mesh Networks Alliance Proposal; 11-05-0605-02-000smesh-networks-alliance-proposal", IEEE Draft, 11-05-0605-02-000S-Mesh-Networksalliance-Proposal, IEEE—SA Mentor, Piscataway, NJ USA, vol. 802.11 s, No. 2, Nov. 8, 2005 (Nov. 8, 2005), XP017688963, pp. 1-46.

* cited by examiner

CHANNEL ACCESS AND MEDIUM RESERVATION MECHANISM

CROSS-REFERENCE TO RELATED APPLICATIONS

This patent application claims priority to U.S. Provisional Patent Application No. 62/530,011 entitled "CHANNEL ACCESS AND MEDIUM RESERVATION MECHANISM" filed on Jul. 7, 2017 and assigned to the assignee hereof. The disclosure of the prior Application is considered part of and is incorporated by reference in this patent application.

TECHNICAL FIELD

This disclosure relates to wireless networks, and specifically to managing channel access to a shared wireless medium.

DESCRIPTION OF THE RELATED TECHNOLOGY

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and maintain a communication link with the WLAN. In a typical BSS, only one device (such as a STA or an AP) may access the wireless medium at any given time, and a STA may be associated with only one AP at a time. WLANs that operate in accordance with the IEEE 802.11 family of standards are commonly referred to as Wi-Fi networks.

To prevent collisions in the WLAN, only one wireless device (such as an AP or a STA) may access the wireless medium at a time. In a typical WLAN, wireless devices may compete for access to the wireless communication medium. For example, the devices may use carrier sense multiple access collision avoidance (CSMA/CA) techniques to "listen" to the wireless medium to determine when the wireless medium is idle. When the wireless medium has been idle for a given duration, the devices may contend for medium access (such as by waiting a "back-off" period before attempting to transmit on the wireless medium). The winning device may be granted exclusive access to the shared wireless medium for a period of time commonly referred to as a transmit opportunity (TXOP), during which only the winning device may transmit (or receive) data over the shared wireless medium.

Although CSMA/CA techniques may be useful for preventing collisions within a single BSS environment, the crowding of frequency bands may require individual APs to coordinate access to the wireless medium with other "master devices" (such as APs or cellular base stations) operating in the same frequency band. For example, the 6 GHz frequency band may be shared by Wi-Fi and other wireless communication technologies (including various cellular communication technologies). Thus, there is a need to coordinate channel access among master devices in a shared wireless medium.

SUMMARY

The systems, methods and devices of this disclosure each have several innovative aspects, no single one of which is solely responsible for the desirable attributes disclosed herein.

One innovative aspect of the subject matter of this disclosure can be implemented in a method of sharing a wireless medium among multiple master devices. The method may be performed by a master device, and may include steps of contending with other master device for access to a wireless medium during a first medium reservation window (MRW); upon gaining access to the wireless medium during the first MRW, transmitting a message to the other master devices advertising a reservation of the wireless medium for a timeslot within a first medium utilization period (MUP); and servicing one or more client devices over the wireless medium during the reserved timeslot within the first MUP. In some aspects, each of the wireless device may comprise a wireless access point or a cellular base station.

In some implementations, the method may further include steps of determining an availability of the wireless medium based on reservation messages transmitted by the other master devices during the first MRW; and selecting the timeslot based on the availability of the wireless medium. The reservation may be for a number of channels, a number of spatial dimensions, a duration of time, or any combination thereof.

In some implementations, at least one of the first MRW or the first MUP may have a fixed duration. In some other implementations, the method may further include a step of determining a duration of the first MRW based at least in part on a number of master devices contending for access to the shared wireless medium during the first MRW. Still further, in some implementations, the method may further include a step of determining a duration of the first MUP based at least in part on a medium access requirement of each master device that reserves a timeslot within the first MUP.

In some implementations, the method may further include a step of sharing at least a portion of the wireless medium, during the reserved timeslot, with another master device. The shared portion of the wireless medium may include a number of unused channels, a number of unused spatial dimensions, an unused duration of time, or a combination thereof. In some aspects, the step of sharing at least a portion of the wireless medium may include a step of advertising an availability of the shared portion of the wireless medium at the start of the reserved timeslot. In some other aspects, the step of sharing at least a portion of the wireless medium may include a step of advertising an availability of the shared portion of the wireless medium after servicing the one or more client devices.

In some implementations, the master device and the other master device may belong to the same master device cluster. Thus, in some aspects, the method may further include steps of determining, during a second MRW, that the other master device has reserved the wireless medium for a timeslot within a second MUP; refraining from contending for access to the wireless medium during the second MRW upon determining that the other master device has reserved the wireless medium; and coordinating access to the wireless medium with the other master device during the timeslot reserved by the other master device within the second MUP.

Another innovative aspect of the subject matter described in this disclosure can be implemented in a master device (such as a wireless access point or a cellular base station). The master device includes one or more processors and a memory. The memory stores instructions that, when executed by the one or more processors, cause the master device to contend with other master devices for access to a wireless medium during a first medium reservation window (MRW); upon gaining access to the wireless medium during the first MRW, transmit a message to the other master devices advertising a reservation of the wireless medium for a timeslot within a first medium utilization period (MUP); and service one or more client devices over the wireless medium during the reserved timeslot within the first MUP.

In some implementations, execution of the instructions may further cause the master device to determine an availability of the wireless medium based on reservation messages transmitted by the other master devices during the first MRW; and select the timeslot based on the availability of the wireless medium. The reservation may be for a number of channels, a number of spatial dimensions, a duration of time, or any combination thereof.

In some implementations, at least one of the first MRW or the first MUP may have a fixed duration. In some other implementations, execution of the instructions may further cause the master device to determine a duration of the first MRW based at least in part on a number of master devices contending for access to the wireless medium during the first MRW. In some other implementations, execution of the instructions may further cause the master device to determine a duration of the first MUP based at least in part on a medium access requirement of each master device that reserves a timeslot within the first MUP.

In some implementations, execution of the instructions may further cause the master device to share at least a portion of the wireless medium, during the reserved timeslot, with another master device. The shared portion of the wireless medium may include a number of unused channels, a number of unused spatial dimensions, an unused duration of time, or a combination thereof.

In some implementations, the master device and the other master device may belong to the same master device cluster. Thus, in some aspects, execution of the instructions may further cause the master device to determine, during a second MRW, that the other master device has reserved the wireless medium for a timeslot within a second MUP; refrain from contending for access to the wireless medium during the second MRW upon determining that the other master device has reserved the wireless medium; and coordinate access to the wireless medium with the other master device during the timeslot reserved by the other master device within the second MUP.

Another innovative aspect of the subject matter described in this disclosure can be implemented in a method of accessing a shared wireless medium by a client device. The method may include steps of detecting a reservation message transmitted by a master device during a medium reservation window (MRW); determining, based on the reservation message, a timeslot for which the master device has reserved access to a shared wireless medium within a medium utilization period (MUP); and scheduling communications with the master device over the shared wireless medium based at least in part on the timeslot reserved by the master device.

In some implementations, the step of detecting the reservation message may include a step of scanning a subset of channels allocated for the MRW, wherein the subset of channels is less than a number of channels available on the shared wireless medium. In some implementations, the step of scheduling communications with the master device may include steps of communicating with the master device over the shared wireless medium during the timeslot reserved by the master device; and operating in a power save state during the remainder of the MUP.

In some aspects, the reservation message may include information indicating one or more capabilities of the master device. In some implementations, the method may further include a step of associating with the master device based at least in part on the information included in the reservation message.

Another innovative aspect of the subject matter described in this disclosure can be implemented in a client device. The client device includes one or more processors and a memory. The memory stores instructions that, when executed by the one or more processors, cause the client device to detect a reservation message transmitted by a master device during a medium reservation window (MRW); determine, based on the reservation message, a timeslot for which the master device has reserved access to a shared wireless medium within a medium utilization period (MUP); and schedule communications with the master device over the shared wireless medium based at least in part on the timeslot reserved by the master device.

In some implementations, execution of the instructions for detecting the reservation message may cause the client device to scan a subset of channels allocated for the MRW, wherein the subset of channels is less than a number of channels available on the shared wireless medium. In some implementations, execution of the instructions for scheduling communications with the master device may cause the client device to communicate with the master device over the shared wireless medium during the timeslot reserved by the master device; and operate in a power save state for the remainder of the MUP.

In some aspects, the reservation message may include information indicating one or more capabilities of the master device. In some implementations, execution of the instructions may further cause the client device to associate with the master device based at least in part on the information included in the reservation message.

BRIEF DESCRIPTION OF THE DRAWINGS

Like reference numbers and designations in the various drawings indicate like elements.

DETAILED DESCRIPTION

Figure 1:
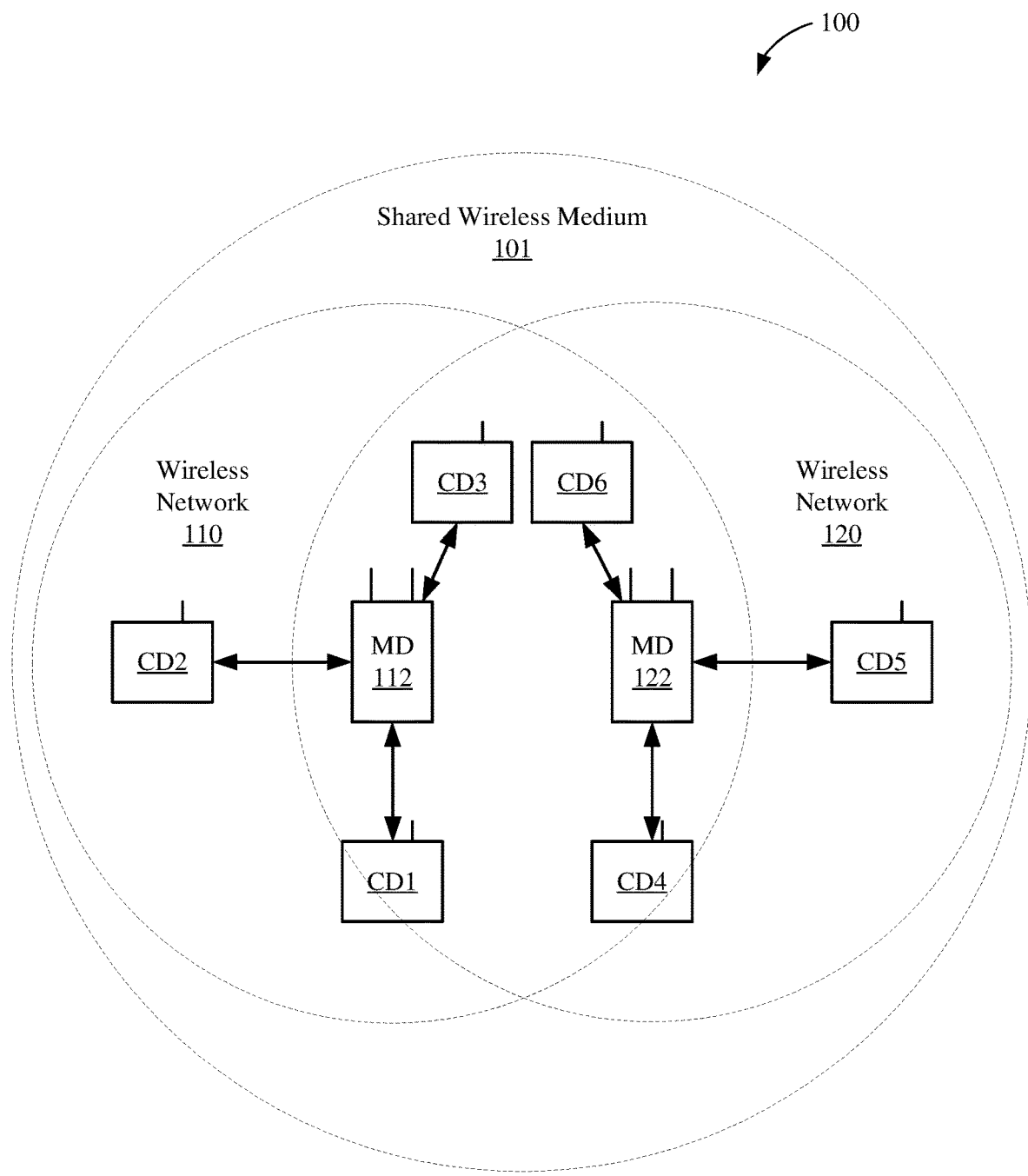
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM or General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A master device (such as a wireless access point, cellular base station, and the like) may operate on a frequency band shared by other master devices in the vicinity. For example, the 6 GHz frequency band may be shared by Wi-Fi and various cellular communication technologies (such as LTE). To avoid interference between different wireless networks and technologies, it may be desirable to schedule or otherwise coordinate access to the wireless medium among the master devices operating on the same frequency band. Thus, the implementations described herein may enable a master device to reserve at least a portion of a shared medium for exclusive access by the master device. For example, during the period that a master device has reserved access to the shared medium, the master device may service its associated client devices (such as STAs or user equipment) without interference from neighboring networks.

In some implementations, master devices may contend for access to the shared medium during a medium reservation window (MRW). For example, during the MRW, master devices may advertise their intent to reserve at least a portion of the shared medium (such as a number of channels or spatial dimensions) for one or more timeslots within a subsequent medium utilization period (MUP). The reservation messages may be broadcast to all master devices in the vicinity (or on a given channel) to prevent other master devices from accessing the wireless medium (or at least a portion thereof) during a reserved timeslot. In some implementations, the owner of a particular timeslot may share at least a portion of its timeslot with one or more other master devices. For example, the owner of a particular timeslot may have reserved a greater portion of the wireless medium than needed. Thus, the timeslot owner may enable other master devices to utilize the unused portion of the wireless medium (such as unused channels or spatial streams).

Particular implementations of the subject matter described in this disclosure can be implemented to realize one or more of the following potential advantages. The implementations may reduce interference for wireless devices and networks configured to operate on a shared frequency band. For example, by requiring master devices to contend for access to the shared medium, aspects of the present disclosure may ensure that each owner of a particular timeslot has exclusive access to the wireless medium during its allotted timeslot within an MUP. Furthermore, because the reservation messages are broadcast during scheduled MRWs, on one or more predetermined channels, client devices may intercept the reservation messages to determine respective medium access times for each master device in the vicinity. This may allow unassociated client devices to quickly identify all available master devices and select a particular master device to associate with. This also may allow associated client devices to enter or remain in a power saving state when their master devices do not have access to the shared medium.

In the following description, numerous specific details are set forth such as examples of specific components, circuits, and processes to provide a thorough understanding of the present disclosure. The term "master device" may refer to any device that provides wireless services (such as a wireless network) to one or more client devices. For example, a master device may correspond to an access point (AP) of a WLAN or a base station (BS) of a cellular network. Thus, the term "client device" may refer to any wireless device that can connect to, or associate with, a master device. For example, a client device may correspond to a wireless station (STA) of a WLAN or a user equipment (UE) of a cellular network. The term "associated client device" refers to a client device that is already associated with a particular master device, and the term "unassociated client device" refers to a client device that is not yet associated with any particular master device. In addition, although described herein in terms of exchanging data frames between wireless devices, the implementations may be applied to the exchange of any data unit, packet, or frame between wireless devices. Thus, the term "frame" may include any frame, packet, or data unit such as, for example, protocol data units (PDUs), medium access control (MAC) protocol data units (MPDUs), aggregated MPDUs (A-MPDUs), and physical layer convergence procedure protocol data units (PPDUs).

FIG. 1 shows a block diagram of an example wireless system 100. The wireless system 100 is shown to include two wireless networks 110 and 120 in relatively close proximity to one another. The first wireless network 110 is formed, at least in part, by a first master device (MD) 112 that services a number of client devices CD1-CD3. The second wireless network 120 is formed, at least in part, by a second master device (MD) 122 that services a number of client devices CD4-CD6. Although only two master devices 112 and 122, and six client devices CD1-CD6, are shown in the example of FIG. 1 for simplicity, it is to be understood that the wireless system 100 may include any number of master devices or client devices.

The client devices CD1-CD6 may include any suitable wireless device including, for example, a cell phone, personal digital assistant (PDA), tablet device, laptop computer, or the like. In some implementations, one or more of the client devices CD1-CD6 may be a wireless station (STA) configured to operate in accordance with the IEEE 802.11 standards. In some other implementations, one or more of the client devices CD1-CD6 may be a user equipment (UE) configured to operate in accordance with one or more cellular communication standards (such as Long Term Evolution (LTE), Global System for Mobile (GSM), and the like). Each of the master devices 112 and 122 may be any suitable device that allows one or more wireless devices to connect to a network (such as a local area network (LAN), wide area network (WAN), metropolitan area network (MAN), a cellular network, or the Internet) using Wi-Fi, Bluetooth, LTE, or any other suitable wireless communication standards. Accordingly, each of the wireless networks 110 and 120 may correspond to a WLAN, cellular (LTE) network, or other wireless communication network. The master devices 112 and 122, and client devices CD1-CD6, may each include one or more transceivers, one or more processing resources (such as processors or ASICs), one or more memory resources, and a power source.

In some implementations, the master devices 112 and 122 may be configured to operate on a shared wireless medium 101. For example, the shared wireless medium 101 may correspond to the 6 GHz frequency band. Due to the relatively close proximity of the master devices 112 and 122, wireless transmissions within one of the wireless networks 110 or 120 may cause interference in the other wireless network. Thus, in some implementations, the master devices 112 and 122 may schedule or otherwise coordinate access to the shared wireless medium 101 so that communications within the first wireless network 110 do not interfere with communications with the second wireless network 120. In some aspects, each of the master devices 112 and 122 may contend for access the shared wireless medium 101.

In some implementations, access to the shared wireless medium may be divided into a medium reservation window (MRW) followed by a medium utilization period (MUP). Master devices may contend for access to the shared wireless medium during the MRW, and may service their associated client devices during the MUP. Thus, the MRW may be relatively short in duration compared to the MUP. In some aspects, the duration of the MRW and the MUP may be fixed. In some other aspects, the duration of the MRW may vary depending on the number of master devices contending for access to the shared wireless medium. Still further, in some aspects, the duration of the MUP may vary depending on the channel access requirements of the master devices.

During the MRW, master devices may use carrier sense multiple access collision avoidance (CSMA/CA) techniques to listen to the wireless medium and wait a random back-off period before attempting to transmit on the wireless medium. In some aspects, each of the master devices may listen to, and contend on, a single common channel of the shared frequency band during the MRW. In some other aspects, the master devices may contend on different channels of the shared frequency band. A "winning" device (any device that gains access to the wireless medium during the MRW) may reserve a timeslot within the following MUP to have exclusive access to the shared medium. For example, each winning device may broadcast a reservation message (RM) advertising the portion of the shared medium it wishes to reserve for the following MUP. In some implementations, the reservation message may be formatted in a manner that can be commonly understood by any master device operating in accordance with any wireless technology (including Wi-Fi APs and cellular base stations). Further, in some implementations, the reservation message may include a bitmap indicating the timeslot to be reserved for the given master device. For example, the duration of the MUP may be subdivided into 4 ms increments. Thus, each bit of the bitmap may represent a 4 ms interval within an upcoming MUP.

Within a given timeslot, a master device may reserve the entirety of the frequency band, a number of channels, a number of spatial streams (or dimensions), or any combination thereof. For example, if a master device reserves the entirety of the frequency band, no other master devices may access the shared wireless medium during the timeslot reserved for that master device. If a master device reserves only a subset of channels within the frequency band, other master devices may access or reserve the unused channels of the shared wireless medium during the timeslot reserved for that master device. If a master device reserves only a subset of spatial streams, other master devices may use or reserve up to the number of unused spatial streams or dimensions of that master device during its reserved timeslot.

Figure 2A:
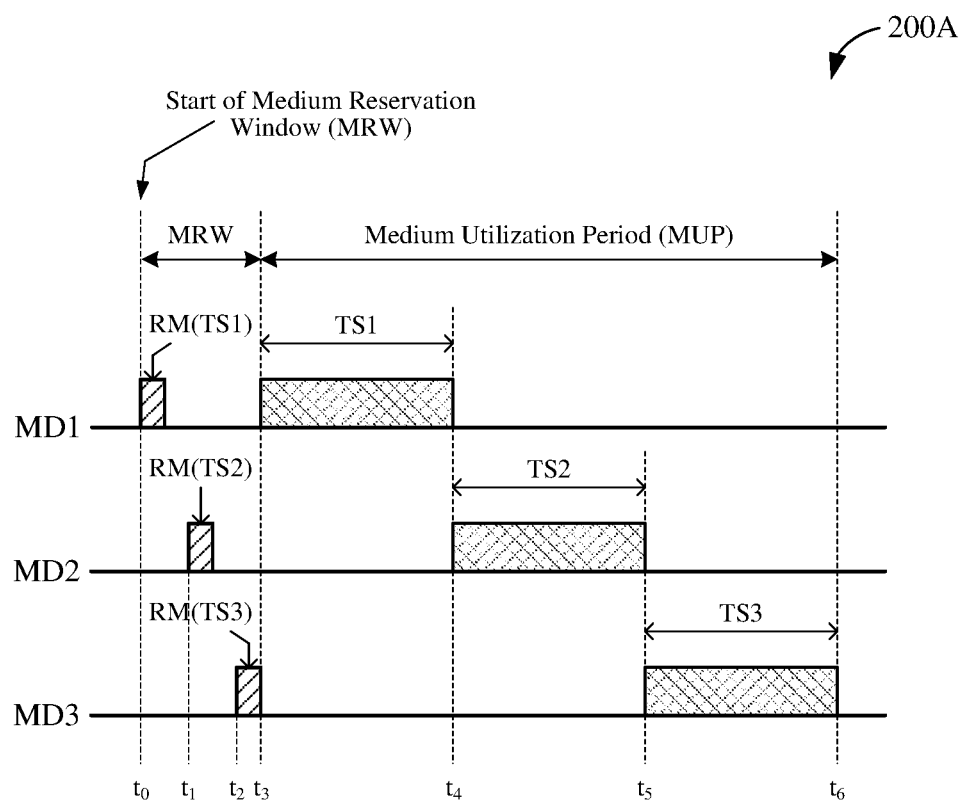
FIGS. 2A and 2B show timing diagrams depicting example channel access schemes for a shared wireless medium.

FIG. 2A shows a timing diagram 200A depicting an example channel access scheme for a shared wireless medium. In the example of FIG. 2A, a number of master devices MD1-MD3 may compete for access to a shared wireless medium (or frequency band). For example, each of the master devices MD1-MD3 may be located within relatively close proximity of one another (such as within wireless communication range). Each of the master devices MD1-MD3 may be an example implementation of master device 112 or master device 122 of FIG. 1. For simplicity, only three master devices MD1-MD3 are shown in the example of FIG. 2A. However, in actual implementations, there may be any number of master devices sharing the same wireless medium (or frequency band).

A medium reservation window (MRW) begins at time $t_0$. During the MRW, from times $t_0$ to $t_3$, the master devices MD1-MD3 may contend for access to the shared wireless medium. In some implementations, each of the master devices MD1-MD3 may listen to, and contend on, a single common channel of the shared frequency band. For example, the first master device MD1 may broadcast a reservation message (RM) upon gaining access to the shared wireless medium at time $t_0$. The reservation message broadcast by the first master device MD1 may advertise a reservation of the shared wireless medium (or at least a number of channels or spatial streams within the shared wireless medium) for the duration of a first timeslot TS1 (from times $t_3$ to $t_4$) within a subsequent medium utilization period (MUP). The other master devices MD2 and MD3 may receive the reservation message broadcast by the first master device MD1 and refrain from accessing any portion of the shared wireless medium reserved by the first master device MD1 during the first timeslot TS1.

The second master device MD2 may broadcast a reservation message upon gaining access to the shared wireless medium at time $t_1$. The reservation message broadcast by the second master device MD2 may advertise a reservation of the shared wireless medium (or at least a number of channels or spatial streams within the shared wireless medium) for the duration of a second timeslot TS2 (from times $t_4$ to $t_5$) within the subsequent MUP. The other master devices MD1 and MD3 may receive the reservation message broadcast by the second master device MD2 and refrain from accessing any portion of the shared wireless medium reserved by the second master device MD2 during the second timeslot TS2.

The third master device MD3 may broadcast a reservation message upon gaining access to the shared wireless medium at time $t_2$. The reservation message broadcast by the third master device MD3 may advertise a reservation of the shared wireless medium (or at least a number of channels or spatial streams within the shared wireless medium) for the duration of a third timeslot TS3 (from times $t_5$ to $t_6$) within the subsequent MUP. The other master devices MD1 and MD2 may receive the reservation message broadcast by the third master device MD3 and refrain from accessing any portion of the shared wireless medium reserved by the third master device MD3 during the third timeslot TS3.

At the start of the MUP, at time $t_3$, the first master device MD1 may be granted exclusive access to the shared wireless medium (or at least a portion thereof) for the duration of the first timeslot TS1. During the first timeslot TS1, from times $t_3$ to $t_4$, the first master device MD1 may service its associated client devices (not shown for simplicity) without interference from the remaining master devices MD2 or MD3. Upon termination of the first timeslot TS1, at time $t_4$, the second master device MD2 may be granted exclusive access to the shared wireless medium (or at least a portion thereof) for the duration of the second timeslot TS2. During the second timeslot TS2, from times $t_4$ to $t_5$, the second master device MD2 may service its associated client devices without interference from the remaining master devices MD1 or MD3. Upon termination of the second timeslot TS2, at time $t_5$, the third master device MD3 may be granted exclusive access to the shared wireless medium (or at least a portion thereof) for the duration of the third timeslot TS3. During the third timeslot TS3, from times $t_5$ to $t_6$, the third master device MD3 may service its associated client devices without interference from the remaining master devices MD1 or MD2. At time $t_6$, the master devices MD1-MD3 may once again contend for access to the shared wireless medium. Thus, the end of the current MUP (at time $t_6$) may coincide with the start of another MRW.

In some aspects, client devices also may listen to the common channel associated with the MRW, from times $t_0$ to $t_3$, to intercept the reservation messages broadcast by the master devices MD1-MD3. For example, an associated client device may determine the times at which its master device has access to the shared wireless medium and is thus available for wireless communications. Accordingly, the associated client device may schedule its power saving states around the availability of its master device. Furthermore, an unassociated client device may detect the presence of nearby master devices without having to scan each wireless channel available on the shared wireless medium. For example, only a relatively small subset of the available channels may be allocated for each MRW. In some implementations, the reservation messages may include additional information advertising the capabilities of the master devices MD1-MD3. Thus, the unassociated client device may use the information provided in the reservation messages (or the signal strengths of the reservation messages) in selecting a particular master device to associate with.

In some implementations, client devices may be prohibited from unsolicited access to the wireless medium during the timeslot reserved by its master device. For example, any access to the shared wireless medium during a reserved timeslot may be scheduled and provisioned by the master device that reserved the timeslot. Thus, client devices may not contend for access to the wireless medium during a reserved timeslot within an MUP. In some aspects, a master device may disable any forms of unscheduled access (such as enhanced distributed channel access (EDCA) or CSMA/CA) to the reserved timeslot within an MUP as long as the master device operates as a collocated BSS. More specifically, as a collocated BSS, the master device may perform the functions of a BSS in two or more frequency bands (such as the 2.4, 5, or 6 GHz frequency bands).

For example, a master device may share the 6 GHz frequency band with other master devices, and may thus contend for access to the 6 GHz with other master devices. More specifically, the master device may contend for access to the 6 GHz frequency band during an MRW and may services its client devices over the 6 GHz frequency band during its reserved timeslot within an MUP. However, if the master device also serves as a BSS in the 2.4 or 5 GHz frequency band, the master device may prohibit its client devices from unscheduled access to the 6 GHz frequency band (specifically, during its reserved timeslot within an MUP) while allowing the client devices to contend for access to the other frequency bands (such as the 2.4 or 5 GHz frequency band).

Figure 2B:
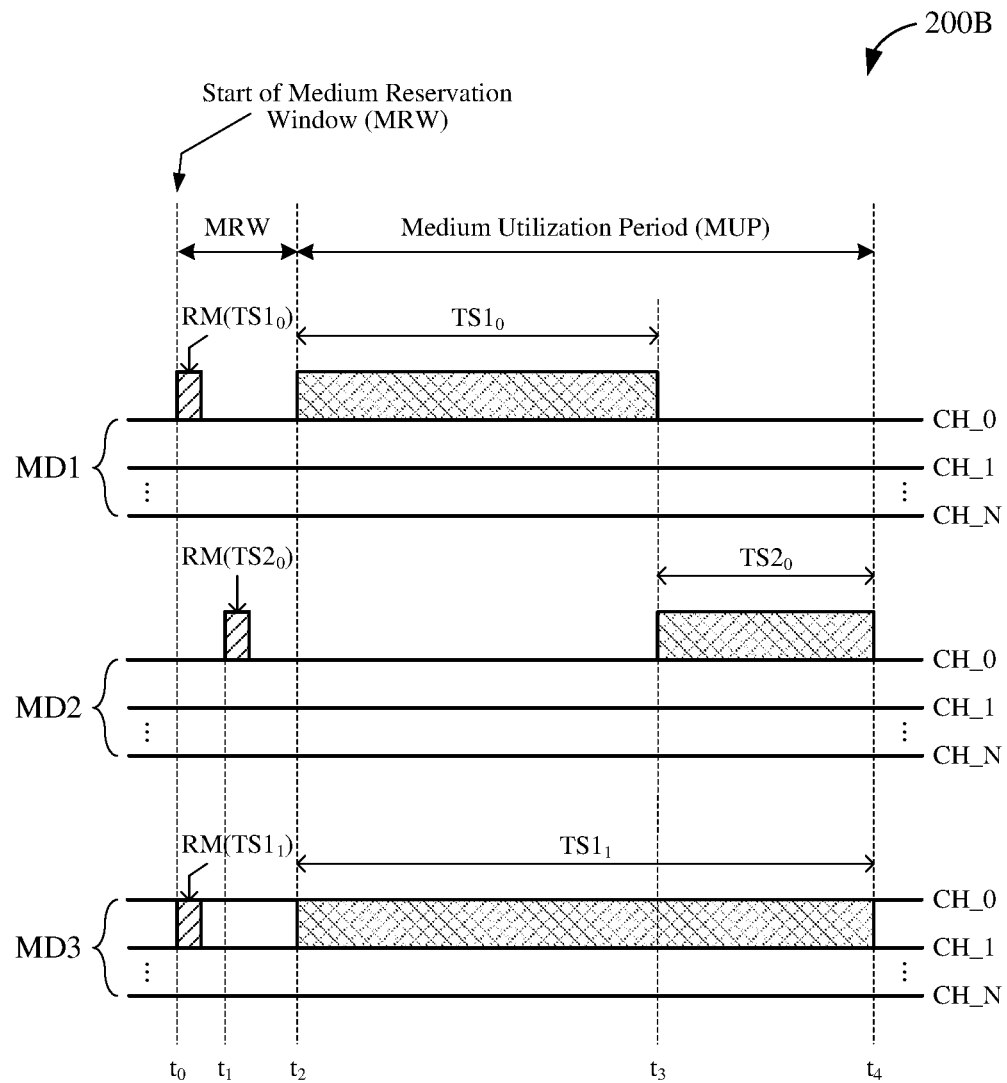

FIG. 2B shows a timing diagram 200B depicting another example channel access scheme for a shared wireless medium. In the example of FIG. 2B, the master devices MD1-MD3 may compete for access to the shared wireless medium (or frequency band) on a per-channel basis. More specifically, each of the master devices MD1-MD3 may compete for individual channels CH_0-CH_N (or subsets of channels) within the shared frequency band. For example, the 6 GHz frequency band may be subdivided into 10-60 channels (depending on regulatory restrictions), each having a bandwidth of 20 MHz. Thus, many master devices may be able to service their associated client devices using only a subset of the total available bandwidth (such as one or more channels) in the shared frequency band.

An MRW begins at time $t_0$. During the MRW, from times $t_0$ to $t_2$, the master devices MD1-MD3 may contend for access to the shared wireless medium. In the example of FIG. 2B, the first and second master devices MD1 and MD2 may listen to, and contend on, a first channel CH_0 of the shared frequency band during the MRW. In contrast, the third master device MD3 may listen to, and contend on, a second channel CH_1 of the shared frequency band during the MRW. For example, the first master device MD1 may broadcast a reservation message (RM) upon gaining access to the first channel CH_0 at time $t_0$. The reservation message broadcast by the first master device MD1 may advertise a reservation of the first channel CH_0 for the duration of a first timeslot $TS1_0$ to (from times $t_2$ to $t_3$) within a subsequent medium utilization period (MUP). The second master device MD2 may receive the reservation message broadcast by the first master device MD1 and refrain from accessing the first channel CH_0 during the first timeslot $TS1_0$. Since the third master device MD3 is not listening to the first channel CH_0, the third master device MD3 may not receive (or be affected by) the reservation message broadcast by the first master device MD1.

The second master device MD2 may broadcast a reservation message upon gaining access to the shared wireless medium at time $t_1$. The reservation message broadcast by the second master device MD2 may advertise a reservation of the first channel CH_0 for the duration of a second timeslot $TS2_0$ (from times $t_3$ to $t_4$) within the subsequent MUP. The first master device MD1 may receive the reservation message broadcast by the first master device MD1 and refrain from accessing the first channel CH_0 during the second timeslot $TS2_0$. Since the third master device MD3 is not listening to the first channel CH_0, the third master device MD3 also may not receive (or be affected by) the reservation message broadcast by the second master device MD2.

Since there are no other master devices contending for access to the second channel CH_1, the third master device MD3 may broadcast a reservation message upon gaining access to the shared wireless medium at time $t_0$. It is noted that the first and third master devices MD1 and MD3 may broadcast reservation messages at substantially the same time (such as at time $t_0$), without interference, because they are operating on different channels. The reservation message broadcast by the third master device MD3 may advertise a reservation of the second channel CH_1 for the duration of a first timeslot $TS1_1$ (from times $t_2$ to $t_4$) within the subsequent MUP. Since the first and second master devices MD1 and MD2 are not listening to the second channel CH_1, the first and second master devices MD1 and MD2 may not receive (or be affected by) the reservation message broadcast by the third master device MD3.

At the start of the MUP, at time $t_2$, the first master device MD1 may be granted exclusive access to the first channel CH_0 for the duration of its corresponding timeslot $TS1_0$, and the third master device MD3 may be granted exclusive access to the second channel CH_1 for the duration of its corresponding timeslot $TS1_1$. During the first timeslot $TS1_0$ on the first channel CH_0, from times $t_2$ to $t_3$, the first master device MD1 may service its associated client devices (not shown for simplicity) without interference from the remaining master devices MD2 or MD3. Also, during the first timeslot $TS1_1$ on the second channel CH_1, from times $t_2$ to $t_4$, the third master device MD3 may service its associated client devices without interference from the remaining master devices MD1 or MD2. Upon termination of the first timeslot $TS1_0$ on the first channel CH_0, at time $t_3$, the second master device MD2 may be granted exclusive access to the first channel CH_0 for the duration of its reserved timeslot $TS2_0$. During the second timeslot $TS2_0$ on the first channel CH_0, from times $t_3$ to $t_4$, the second master device MD2 may service its associated client device without interference from the remaining master devices MD2 or MD3.

At time $t_4$, the master devices MD1-MD3 may once again contend for access to the shared wireless medium. Thus, the end of the current MUP (at time $t_4$) may coincide with the start of another MRW. In some aspects, client devices also may listen to one or more of the channels CH_0-CH_N of the shared frequency band, during MRWs, to intercept the reservation messages broadcast by the master devices MD1-MD3. For example, an associated client device may listen to the channel(s) on which its master device operates to determine when the master device is available for wireless communications. Accordingly, the associated client device may schedule its power saving states around the availability of its master device. Furthermore, an unassociated client device may detect the presence of nearby master devices without having to scan each wireless channel available on the shared wireless medium. For example, only a relatively small subset of the available channels (CH_0-CH_N) may be allocated for each MRW. In some implementations, the reservation messages may include additional information advertising the capabilities of the master devices MD1-MD3. Thus, the unassociated client device may use the information provided in the reservation message (or the signal strengths of the reservation messages) in selecting a particular master device to associate with.

In some implementations, client devices may be prohibited from unsolicited access to the wireless medium during the timeslot reserved by its master device. For example, any access to the shared wireless medium during a reserved timeslot may be scheduled by the master device that reserved the timeslot. Thus, client devices may not contend for access to the wireless medium during a reserved timeslot. In some aspects, a master device may disable any forms of unscheduled access (such as EDCA or CSMA/CA) to the reserved timeslot within an MUP as long as the master device operates as a collocated BSS (and unscheduled access is permitted on one of the other frequency bands in which the master device operates).

Figure 3A:
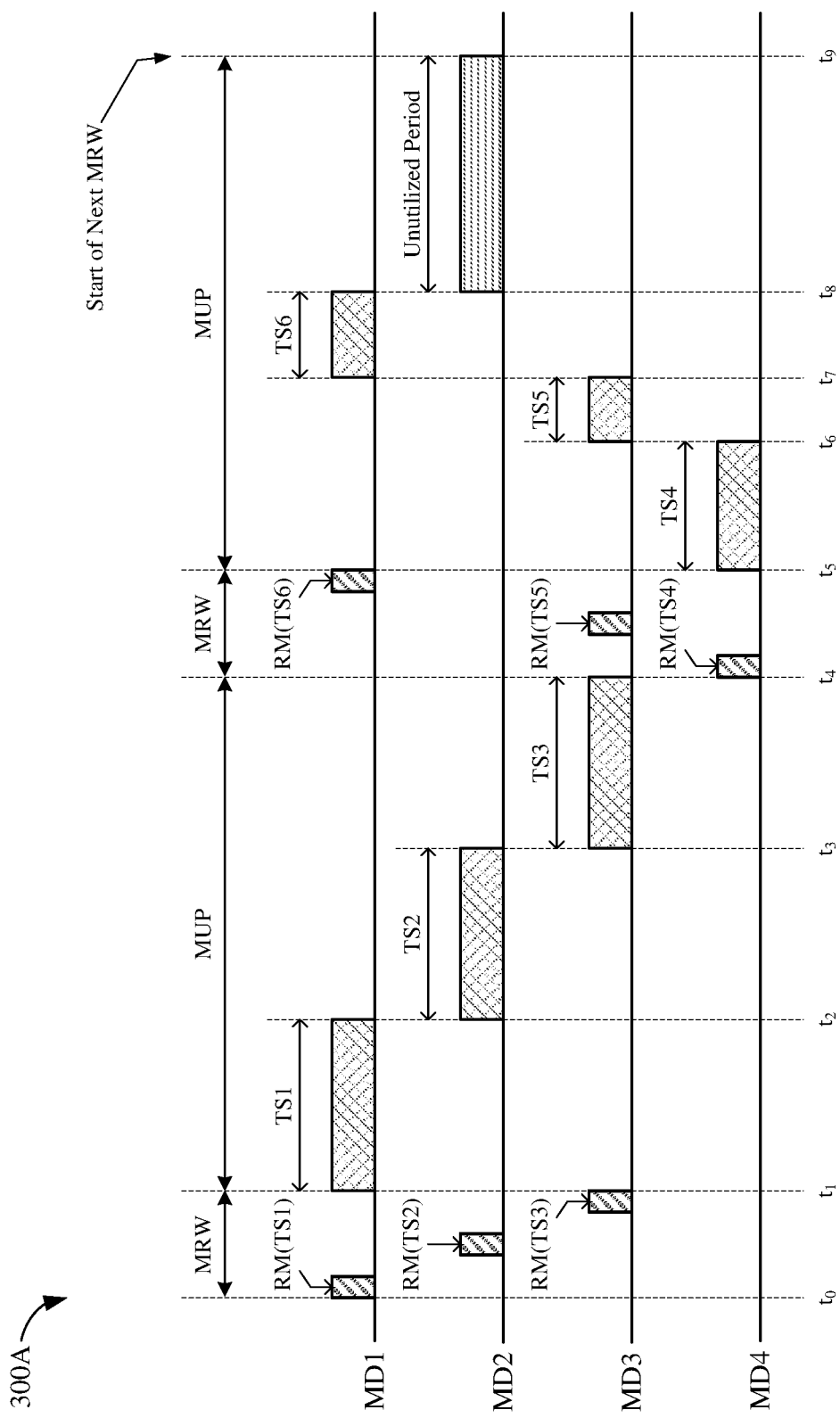
FIGS. 3A and 3B show timing diagrams depicting example channel access schemes with fixed medium reservation windows.

FIG. 3A shows a timing diagram 300A depicting an example channel access scheme with a fixed medium reservation window and a fixed medium utilization period. In the example of FIG. 3A, a number of master devices MD1-MD4 may compete for access to a shared wireless medium (or frequency band). For example, each of the master devices MD1-MD4 may be located within relatively close proximity of one another (such as within wireless communication range). Each of the master devices MD1-MD4 may be an example implementation of master device 112 or master device 122 of FIG. 1. For simplicity, only four master devices MD1-MD4 are shown in the example of FIG. 3A. However, in actual implementations, there may be any number of master devices sharing the same wireless medium (or frequency band).

An MRW begins at time $t_0$. In some implementations, the MRW may have a fixed duration (such as from times $t_0$ to $t_1$). However, the duration of the MRW may be periodically adjusted based at least in part on the number of master devices sharing the wireless medium at a particular instance of time (such as at certain epochs). During the MRW, from times $t_0$ to $t_1$, the master devices MD1-MD4 may contend for access to the shared wireless medium. In some implementations, the master devices MD1-MD4 may listen to, and contend on, a single common channel of the shared frequency band (such as described with respect to FIG. 2A). In some other implementations, the master devices MD1-MD4 may contend for access to the shared wireless medium on a per-channel basis (such as described with respect to FIG. 2B).

During the MRW, from times $t_0$ to $t_1$, the first master device MD1 may broadcast a reservation message advertising a reservation of the shared wireless medium for the duration of a first timeslot TS1 (from times $t_1$ to $t_2$), the second master device MD2 may broadcast a reservation message advertising a reservation of the shared wireless medium for the duration of a second timeslot TS2 (from times $t_2$ to $t_3$), and the third master device MD3 may broadcast a reservation message advertising a reservation of the shared wireless medium for the duration of a third timeslot TS3 (from times $t_3$ to $t_4$). In the example of FIG. 3A, the MRW has a fixed duration (such as from times $t_0$ to $t_1$) that can accommodate a maximum of three reservation messages. Thus, it is noted that the fourth master device does not have time to broadcast a reservation message before the MRW terminates (at time $t_1$).

At the start of the MUP, at time $t_1$, the first master device MD1 may be granted exclusive access to the shared wireless medium (or at least a portion thereof) for the duration of the first timeslot TS1. During the first timeslot TS1, the first master device MD1 may service its associated client devices without interference from the remaining master devices MD2-MD4. Upon termination of the first timeslot TS1, at time $t_2$, the second master device MD2 may be granted exclusive access to the shared wireless medium (or at least a portion thereof) for the duration of the second timeslot TS2. During the second timeslot TS2, the second master device MD2 may service its associated client devices without interference from the remaining master devices MD1, MD3, or MD4. Upon termination of the second timeslot TS2, at time $t_3$, the third master device MD3 may be granted exclusive access to the shared wireless medium (or at least a portion thereof) for the duration of the third timeslot TS3. During the third timeslot TS3, the third master device MD3 may service its associated client devices without interference from the remaining master devices MD1, MD2, or MD4.

A subsequent MRW begins at time $t_4$. During the subsequent MRW, from times $t_4$ to $t_5$, the master devices MD1-MD4 may once again contend for access to the shared wireless medium. For example, the fourth master device MD4 may broadcast a reservation message advertising a reservation of the shared wireless medium for the duration of a fourth timeslot TS4 (from times $t_5$ to $t_6$), the third master device MD3 may broadcast a reservation message advertising a reservation of the shared wireless medium for the duration of a fifth timeslot TS5 (from times $t_6$ to $t_7$), and the first master device MD1 may broadcast a reservation message advertising a reservation of the shard wireless medium for the duration of a sixth timeslot TS6 (from times $t_7$ to $t_8$). It is noted that, due to the fixed duration of the MRW (from times $t_4$ to $t_5$), the second master device does not have time to broadcast a reservation message before the MRW terminates (at time $t_5$).

At the start of the next MUP, at time $t_5$, the fourth master device MD4 may be granted exclusive access to the shared wireless medium (or at least a portion thereof) for the duration of the fourth timeslot TS4. During the fourth timeslot TS4, the fourth master device MD4 may service its associated client devices without interference from the remaining master devices MD1-MD3. Upon termination of the fourth timeslot TS4, at time $t_6$, the third master device MD3 may be granted exclusive access to the shared wireless medium (or at least a portion thereof) for the duration of the fifth timeslot TS5. During the fifth timeslot TS5, the third master device MD3 may service its associated client devices without interference from the remaining master devices MD1, MD2, or MD4. Upon termination of the fifth timeslot TS5, at time $t_7$, the first master device MD1 may be granted exclusive access to the shared wireless medium (or at least a portion thereof) for the duration of the sixth timeslot TS6. During the sixth timeslot TS6, the first master device MD1 may service its associated client devices without interference from the remaining master devices MD2-MD4.

In the example of FIG. 3A, the MUP also has a fixed duration. For example, the duration of the first MUP (from times $t_1$ to $t_4$) is equal to the duration of the second MUP (from times $t_5$ to $t_9$). However, the master devices MD1, MD3, and MD4 may not utilize the entire duration of the MUP. For example, the last reserved timeslot TS6 terminates (at time $t_8$) before the end of the MUP (at time $t_9$). Thus, there is a period of time, from times $t_8$ to $t_9$, in which the shared wireless medium is left unutilized. In some implementations, one or more master devices that were unable to reserve a timeslot within the given MUP (such as the second master device MD2) may access the shared wireless medium during the unutilized period. In some aspects, master devices may reserve the shared wireless medium during the unutilized period using contention-based channel access techniques (such as CSMA/CA). In some other aspects, the owner of the last timeslot (such as the first master device MD1) may arbitrate access to the wireless medium during the unutilized period.

Figure 3B:
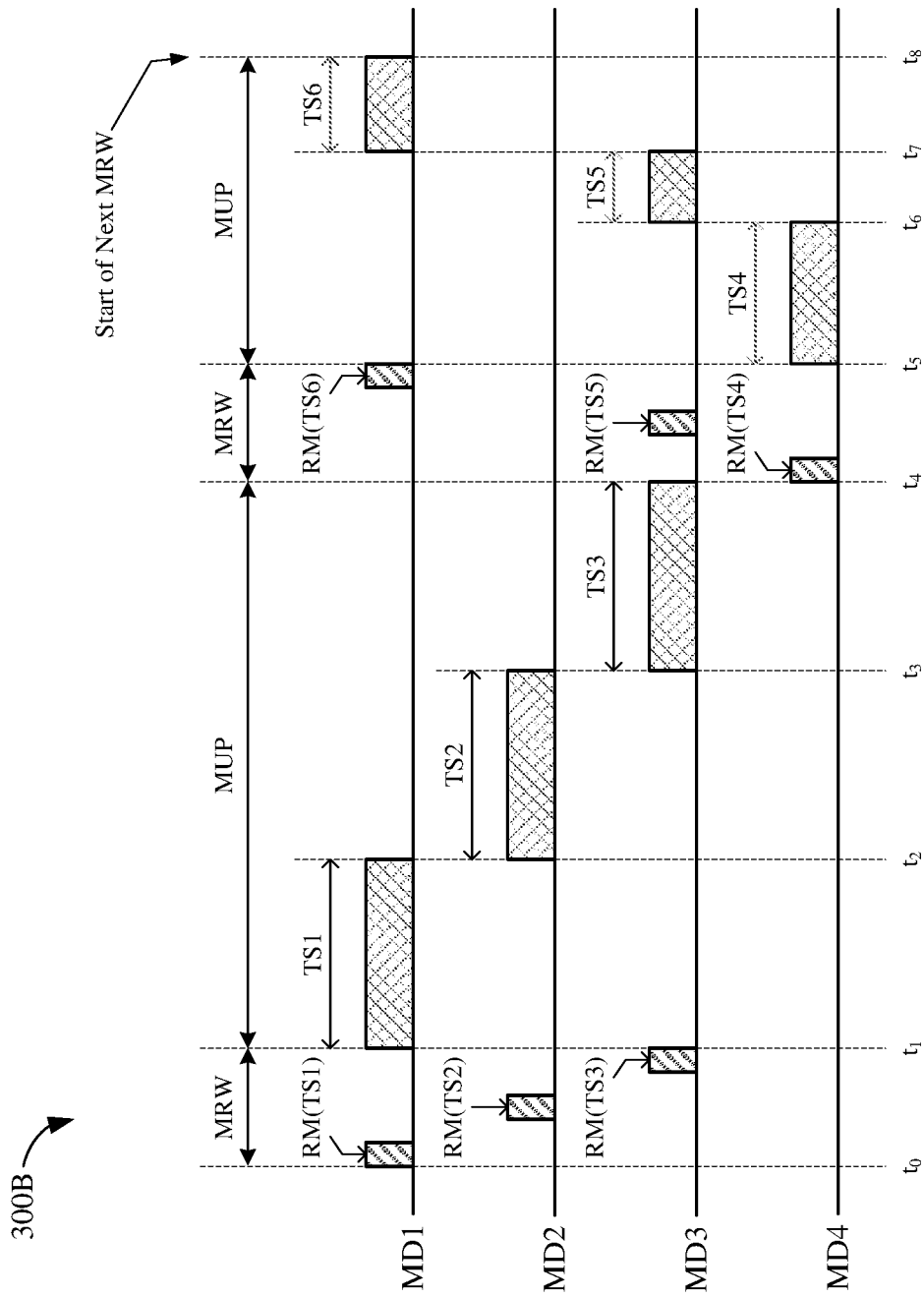

FIG. 3B shows a timing diagram 300B depicting an example channel access scheme with a fixed medium reservation window and a variable medium utilization period. In the example of FIG. 3B, the duration of the MUP may vary (dynamically) based on the medium access requirements of the master devices MD1-MD4. More specifically, the MUP may terminate at the end of the last reserved timeslot within the given MUP. Accordingly, there may be no unutilized period within any MUP. In some implementations, the last master device to reserve a timeslot during a corresponding MRW may broadcast a message indicating when the upcoming MUP is expected to terminate (and when the next MRW is expected to begin). In some other implementations, each of the master devices MD1-MD4 may determine the start of the next MRW based on the end of the last reserved timeslot (such as by monitoring the reservation messages broadcast during the MRW).

An MRW begins at time $t_0$. In some implementations, the MRW may have a fixed duration (such as from times $t_0$ to $t_1$). However, the duration of the MRW may be periodically adjusted based at least in part on the number of master devices sharing the wireless medium at a particular instance of time (such as at certain epochs). During the MRW, from times $t_0$ to $t_1$, the master devices MD1-MD4 may contend for access to the shared wireless medium. For example, the first master device MD1 may broadcast a reservation message advertising a reservation of the shared wireless medium for the duration of a first timeslot TS1 (from times $t_1$ to $t_2$), the second master device MD2 may broadcast a reservation message advertising a reservation of the shared wireless medium for the duration of a second timeslot TS2 (from times $t_2$ to $t_3$), and the third master device MD3 may broadcast a reservation message advertising a reservation of the shared wireless medium for the duration of a third timeslot TS3 (from times $t_3$ to $t_4$).

In some implementations, the master devices MD1-MD4 may determine the start of the next MRW based on the reservation messages broadcast during the current MRW. For example, the start of the next MRW may coincide with the end of the last timeslot (TS3) reserved during the current MRW. Thus, in the example of FIG. 3B, the master devices MD1-MD4 may determine that the next MRW is expected to begin at time $t_4$. It is noted that, due to the fixed duration of the MRW (from times $t_0$ to $t_1$) the fourth master device does not have time to broadcast a reservation message before the MRW terminates (at time $t_1$).

At the start of the MUP, at time $t_1$, the first mater device MD1 may be granted exclusive access to the shared wireless medium (or at least a portion thereof) for the duration of the first timeslot TS1. During the first timeslot TS1, the first master device MD1 may service its associated client devices without interference from the remaining master devices MD2-MD4. Upon termination of the first timeslot TS1, at time $t_2$, the second master device MD2 may be granted exclusive access to the shared wireless medium (or at least a portion thereof) for the duration of the second timeslot TS2. During the second timeslot TS2, the second master device MD2 may service its associated client devices without interference from the remaining master devices MD1, MD3, or MD4. Upon termination of the second timeslot TS2, at time $t_3$, the third master device MD3 may be granted exclusive access to the shared wireless medium (or at least a portion thereof) for the duration of the third timeslot TS3. During the third timeslot TS3, the third master device MD3 may service its associated client devices without interference from the remaining master devices MD1, MD2, or MD4.

A subsequent MRW begins at time $t_4$. During the subsequent MRW, from times $t_4$ to $t_5$, the master devices MD1-MD4 may once again contend for access to the shared wireless medium. For example, the fourth master device MD4 may broadcast a reservation message advertising a reservation of the shared wireless medium for the duration of a fourth timeslot TS4 (from times $t_5$ to $t_6$), the third master device MD3 may broadcast a reservation message advertising a reservation of the shared wireless medium for the duration of a fifth timeslot TS5 (from times $t_6$ to $t_7$), and the first master device MD1 may broadcast a reservation message advertising a reservation of the shard wireless medium for the duration of a sixth timeslot TS6 (from times $t_7$ to $t_8$). In some implementations, the master devices MD1-MD4 may determine the start of the next MRW based on the last timeslot (TS6) reserved during the current MRW. Thus, in the example of FIG. 3B, the master devices MD1-MD4 may determine that the next MRW is expected to begin at time $t_8$. It is noted that, due to the fixed duration of the MRW (from times $t_4$ to $t_5$), the second master device does not have time to broadcast a reservation message before the MRW terminates (at time $t_5$).

At the start of the next MUP, at time $t_5$, the fourth master device MD4 may be granted exclusive access to the shared wireless medium (or at least a portion thereof) for the duration of the fourth timeslot TS4. During the fourth timeslot TS4, the fourth master device MD4 may service its associated client devices without interference from the remaining master devices MD1-MD3. Upon termination of the fourth timeslot TS4, at time $t_6$, the third master device MD3 may be granted exclusive access to the shared wireless medium (or at least a portion thereof) for the duration of the fifth timeslot TS5. During the fifth timeslot TS5, the third master device MD3 may service its associated client devices without interference from the remaining master devices MD1, MD2, or MD4. Upon termination of the fifth timeslot TS5, at time $t_7$, the first master device MD1 may be granted exclusive access to the shared wireless medium (or at least a portion thereof) for the duration of the sixth timeslot TS6. During the sixth timeslot TS6, the first master device MD1 may service its associated client devices without interference from the remaining master devices MD2-MD4.

In the example of FIG. 3B, the MUP terminates at the end of the sixth timeslot TS6 (at time $t_8$). In comparison with the example channel access scheme depicted in FIG. 3A, there are no unutilized periods in the MUP of FIG. 3B. Thus, the duration of the MUP may vary based on the medium access requirements of the master devices MD1-MD4. For example, as shown in FIG. 3B, the master devices MD1-MD4 collectively require longer access to the shared wireless medium during the first MUP (from times $t_1$ to $t_4$) than during the second MUP (from times $t_5$ to $t_8$). Accordingly, the duration of the second MUP is substantially shorter than the duration of the first MUP.

Figure 4A:
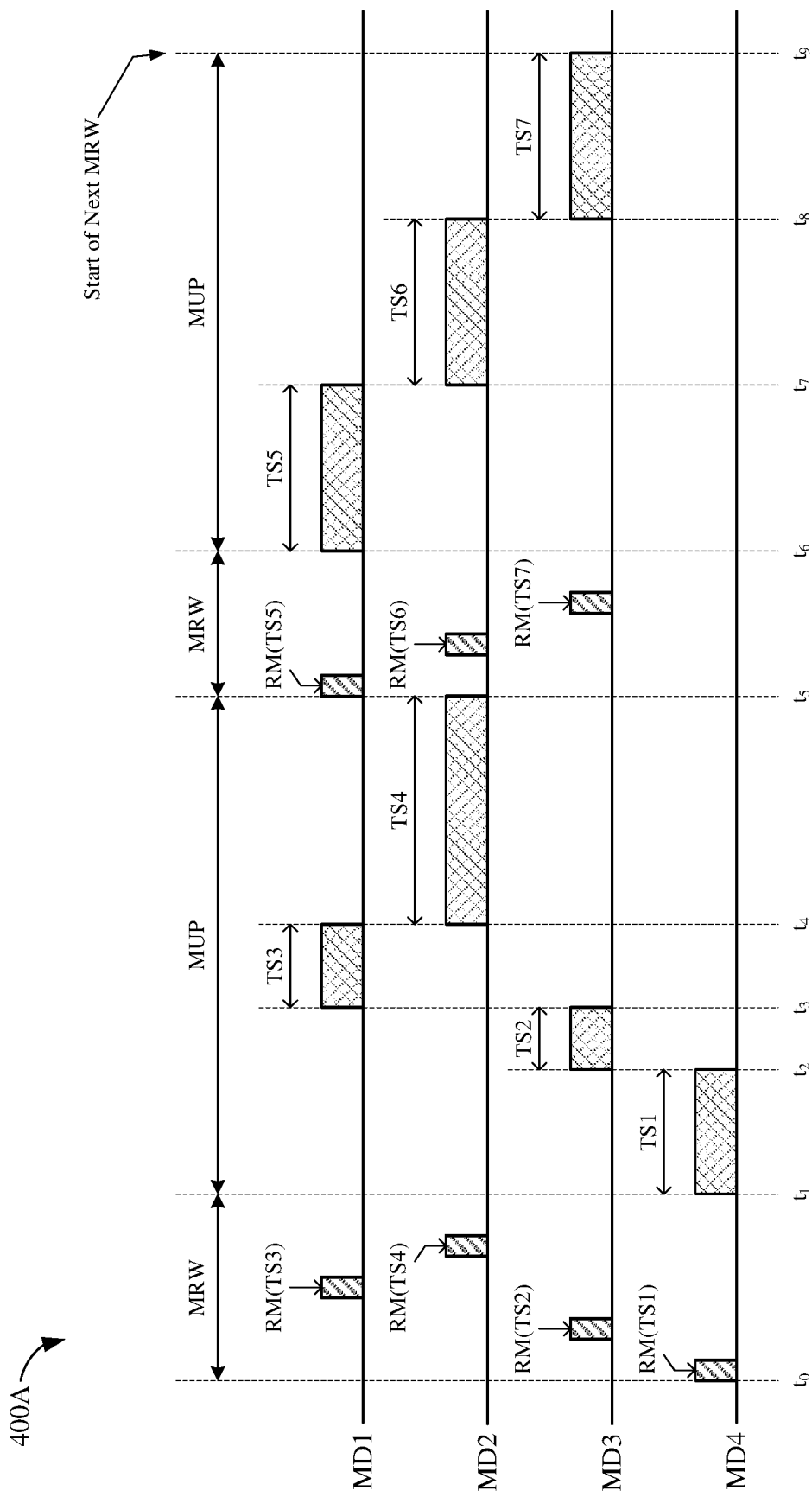
FIGS. 4A and 4B show timing diagrams depicting example channel access schemes with variable medium reservation windows.

FIG. 4A shows a timing diagram 400A depicting an example channel access scheme with a variable medium reservation window and a fixed medium utilization period. In the example of FIG. 4A, a number of master devices MD1-MD4 may compete for access to a shared wireless medium (or frequency band). For example, each of the master devices MD1-MD4 may be located within relatively close proximity of one another (such as within wireless communication range). Each of the master devices MD1-MD4 may be an example implementation of master device 112 or master device 122 of FIG. 1. For simplicity, only four master devices MD1-MD4 are shown in the example of FIG. 4A. However, in actual implementations, there may be any number of master devices sharing the same wireless medium (or frequency band).

An MRW begins at time $t_0$. During the MRW, the master devices MD1-MD4 may contend for access to the shared wireless medium. In some implementations, the master devices MD1-MD4 may listen to, and contend on, a single common channel of the shared frequency band (such as described with respect to FIG. 2A). In some other implementations, the master devices MD1-MD4 may contend for access to the shared wireless medium on a per-channel basis (such as described with respect to FIG. 2B). Still further, in some implementations, the duration of the MRW may vary (dynamically) depending on the number of master devices contending for access to the shared wireless medium. For example, the MRW may not terminate until each of the master devices MD1-MD4 has had chance to access the shared wireless medium (such as to broadcast a reservation message). In some aspects, the MRW may terminate after a period of inactivity has lapsed.

During the MRW, from times $t_0$ to $t_1$, the fourth master device MD4 may broadcast a reservation message advertising a reservation of the shared wireless medium for the duration of a first timeslot TS1 (from times $t_1$ to $t_2$), the third master device MD3 may broadcast a reservation message advertising a reservation of the shared wireless medium for the duration of a second timeslot TS2 (from times $t_2$ to $t_3$), the first master device MD1 may broadcast a reservation message advertising a reservation of the shared wireless medium for the duration of a third timeslot TS3 (from times $t_3$ to $t_4$), and the second master device MD2 may broadcast a reservation message advertising a reservation of the shared wireless medium for the duration of a fourth timeslot TS4 (from times $t_4$ to $t_5$). In the example of FIG. 4A, the master devices MD1-MD4 may determine that the MRW has terminated when no additional reservations messages have been broadcast on the shared wireless medium for at least a threshold period after the reservation message broadcast by the second master device MD2 (such as at time $t_1$).

At the start of the MUP, at time $t_1$, the fourth master device MD4 may be granted exclusive access to the shared wireless medium (or at least a portion thereof) for the duration of the first timeslot TS1 (from times $t_1$ to $t_2$). Upon termination of the first timeslot TS1, at time $t_2$, the third master device MD3 may be granted exclusive access to the shared wireless medium (or at least a portion thereof) for the duration of the second timeslot TS2 (from times $t_2$ to $t_3$). Upon termination of the second timeslot TS2, at time $t_3$, the first master device MD1 may be granted exclusive access to the shared wireless medium (or at least a portion thereof) for the duration of the third timeslot TS3 (from times $t_3$ to $t_4$). Upon termination of the third timeslot TS3, at time $t_4$, the second master device MD2 may be granted exclusive access to the shared wireless medium (or at least a portion thereof) for the duration of the fourth timeslot TS4 (from times $t_4$ to $t_5$).

A subsequent MRW begins at time $t_5$. During the subsequent MRW, the master devices MD1-MD4 may once again contend for access to the shared wireless medium. For example, the first master device MD1 may broadcast a reservation message advertising a reservation of the shared wireless medium for the duration of a fifth timeslot TS5 (from times $t_6$ to $t_7$), the second master device MD2 may broadcast a reservation message advertising a reservation of the shared wireless medium for the duration of a sixth timeslot TS6 (from times $t_7$ to $t_8$), and the third master device MD3 may broadcast a reservation message advertising a reservation of the shared wireless medium for the duration of a seventh timeslot TS7 (from times $t_8$ to $t_9$).

It is noted that, even though the MRW may be configured to accommodate reservation messages from each of the master devices MD1-MD4, the fourth master device MD4 may be unable to reserve any remaining timeslots due to the fixed duration of the MUP. For example, master devices MD1-MD3 have reserved all of the available time in the upcoming MUP. Thus, the duration of the second MRW (from times $t_5$ to $t_6$) may be shorter than the first MRW (from times $t_0$ to $t_1$). In some aspects, the master devices MD1-MD4 may determine that the MRW has terminated when no additional reservation messages have been broadcast on the shared wireless medium for at least a threshold period after the reservation message broadcast by the third master device MD3 (such as at time $t_6$).

At the start of the next MUP, at time $t_6$, the first master device MD1 may be granted exclusive access to the shared wireless medium (or at least a portion thereof) for the duration of the fifth timeslot TS5 (from times $t_6$ to $t_7$). Upon termination of the fifth timeslot TS5, at time $t_7$, the second master device MD2 may be granted exclusive access to the shared wireless medium (or at least a portion thereof) for the duration of the sixth timeslot TS6 (from times $t_7$ to $t_8$). Upon termination of the sixth timeslot TS6, at time $t_8$, the third master device MD3 may be granted exclusive access to the shared wireless medium (or at least a portion thereof) for the duration of the seventh timeslot TS7 (from times $t_8$ to $t_9$). In the example of FIG. 4A, the MUP terminates at the end of the seventh timeslot TS7 (at time $t_9$), before all of the master devices MD1-MD4 have had a chance to access the shared wireless medium.

Figure 4B:
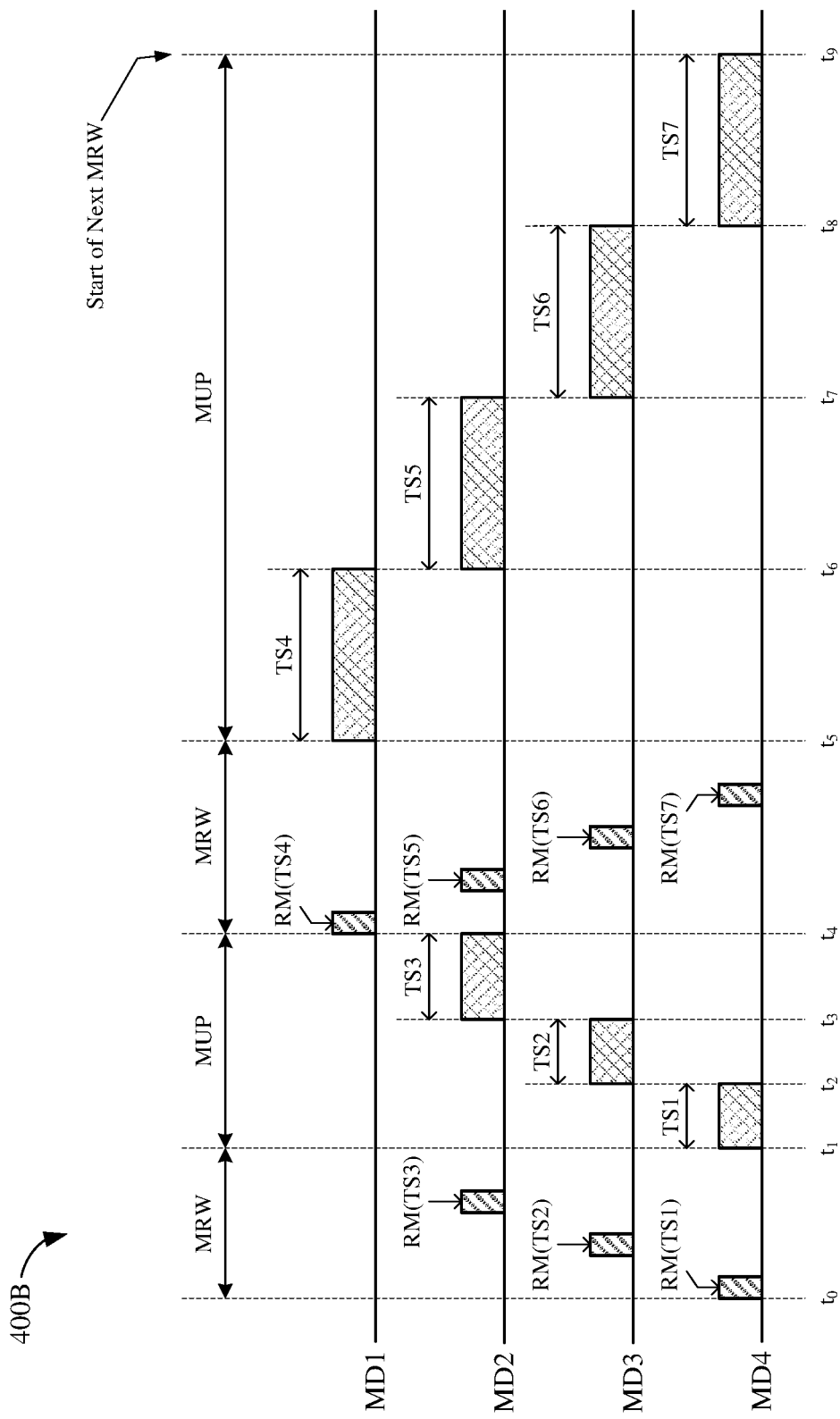

FIG. 4B shows a timing diagram 400B depicting an example channel access scheme with a variable medium reservation window and a variable medium utilization period. In the example of FIG. 4B, the duration of the MUP may vary (dynamically) based on the medium access requirements of the master devices MD1-MD4. More specifically, the MUP may terminate at the end of the last reserved timeslot within the given MUP. In some implementations, the last master device to reserve a timeslot during a corresponding MRW may broadcast a message indicating when the upcoming MUP is expected to terminate (and when the next MRW is expected to begin). In some other implementations, each of the master devices MD1-MD4 may determine the start of the next MRW based on the end of the last reserved timeslot (such as by monitoring the reservation messages broadcast during the MRW).

An MRW begins at time $t_0$. During the MRW, the master devices MD1-MD4 may contend for access to the shared wireless medium. In some implementations, the duration of the MRW may vary (dynamically) depending on the number of mater devices contending for access to the shared wireless medium. In the example of FIG. 4B, the duration of the MRW may be long enough to allow each of the master devices MD1-MD4 to access and broadcast a reservation message on the shared wireless medium. However, only master devices MD2-MD4 may require access to the shared wireless medium for the upcoming MUP. For example, the first master device MD1 may not have any associated client devices to service at this time. In some other implementations, the master devices MD1-MD4 may determine that the start of the next MRW is to coincide with the end of the last timeslot (TS3) reserved during the current MRW. Thus, in the example of FIG. 4B, the master devices MD1-MD4 may determine that the next MRW is expected to begin at time $t_4$.

During the MRW, from times $t_0$ to $t_1$, the fourth master device MD4 may broadcast a reservation message advertising a reservation of the shared wireless medium for the duration of a first timeslot TS1 (from times $t_1$ to $t_2$), the third master device MD3 may broadcast a reservation message advertising a reservation of the shared wireless medium for the duration of a second timeslot TS2 (from times $t_2$ to $t_3$), and the second master device MD2 may broadcast a reservation message advertising a reservation of the shared wireless medium for the duration of a third timeslot TS3 (from times $t_3$ to $t_4$). In the example of FIG. 4B, the master devices MD1-MD4 may determine that the MRW has terminated when no additional reservation messages have been broadcast on the shared wireless medium for at least a threshold period after the reservation message broadcast by the second master device MD2 (such as at time $t_1$).

At the start of the MUP, at time $t_1$, the fourth master device MD4 may be granted exclusive access to the shared wireless medium (or at least a portion thereof) for the duration of the first timeslot TS1 (from times $t_1$ to $t_2$). Upon termination of the first timeslot TS1, at time $t_2$, the third master device MD3 may be granted exclusive access to the shared wireless medium (or at least a portion thereof) for the duration of the second timeslot TS2 (from times $t_2$ to $t_3$). Upon termination of the second timeslot TS2, at time $t_3$, the second master device MD2 may be granted exclusive access to the shared wireless medium (or at least a portion thereof) for the duration of the third timeslot TS3 (from times $t_3$ to $t_4$). In the example of FIG. 4B, the MUP terminates at the end of the third timeslot TS3 (at time $t_4$), after each master device requesting access to the shared wireless medium (such as master devices MD2-MD4) has had a chance to access the shared wireless medium.

A subsequent MRW begins at time $t_4$. During the subsequent MRW, the master devices MD1-MD4 may once again contend for access to the shared wireless medium. For example, the first master device MD1 may broadcast a reservation message advertising a reservation of the shared wireless medium for the duration of a fourth timeslot TS4 (from times $t_5$ to $t_6$), the second master device MD2 may broadcast a reservation message advertising a reservation of the shared wireless medium for the duration of a fifth timeslot TS5 (from times $t_6$ to $t_7$), the third master device MD3 may broadcast a reservation message advertising a reservation of the shared wireless medium for the duration of a sixth timeslot TS6 (from times $t_7$ to $t_8$), and the fourth master device MD4 may broadcast a reservation message advertising a reservation of the shared wireless medium for the duration of a seventh timeslot TS7 (from times $t_8$ to $t_9$).

It is noted that, at this time, all four of the master devices MD1-MD4 may require access to the wireless medium for the upcoming MUP. Thus, the duration of the second MRW (from times $t_4$ to $t_5$) may be longer than the duration of the first MRW (from times $t_0$ to $t_1$). In some aspects, the master devices MD1-MD4 may determine that the MRW has terminated when no additional reservation messages have been broadcast on the shared wireless medium for at least a threshold period after the reservation message broadcast by the fourth master device MD4 (such as at time $t_5$). In some other aspects, the master devices MD1-MD4 may determine the start of the next MRW based on the last timeslot (TS7) reserved during the current MRW. Thus, in the example of FIG. 4B, the master devices MD1-MD4 may determine that the next MRW is expected to begin at time $t_9$.

At the start of the next MUP, at time $t_5$, the first master device MD1 may be granted exclusive access to the shared wireless medium (or at least a portion thereof) for the duration of the fourth timeslot TS4 (from times $t_5$ to $t_6$). Upon termination of the fourth timeslot TS4, at time $t_6$, the second master device MD2 may be granted exclusive access to the shared wireless medium (or at least a portion thereof) for the duration of the fifth timeslot TS5 (from times $t_6$ to $t_7$). Upon termination of the fifth timeslot TS5, at time $t_7$, the third master device MD3 may be granted exclusive access to the shared wireless medium (or at least a portion thereof) for the duration of the sixth timeslot TS6 (from times $t_7$ to $t_8$). Upon termination of the sixth timeslot TS6, at time $t_8$, the fourth master device MD4 may be granted exclusive access to the shared wireless medium (or at least a portion thereof) for the duration of the seventh timeslot TS7 (from times $t_8$ to $t_9$).

In the example of FIG. 4B, the MUP terminates at the end of the seventh timeslot TS7 (at time $t_9$), after each of the master devices MD1-MD4 has had a chance to access the shared wireless medium. Thus, the duration of the MUP may vary based on the medium access requirement of the master devices MD1-MD4. For example, as shown in FIG. 4B, the master devices MD1-MD4 collectively require longer access to the shared wireless medium during the second MUP (from times $t_5$ to $t_9$) than during the first MUP (from times $t_1$ to $t_4$). Accordingly, the duration of the second MUP is substantially longer than the duration of the first MUP.

Figure 5A:
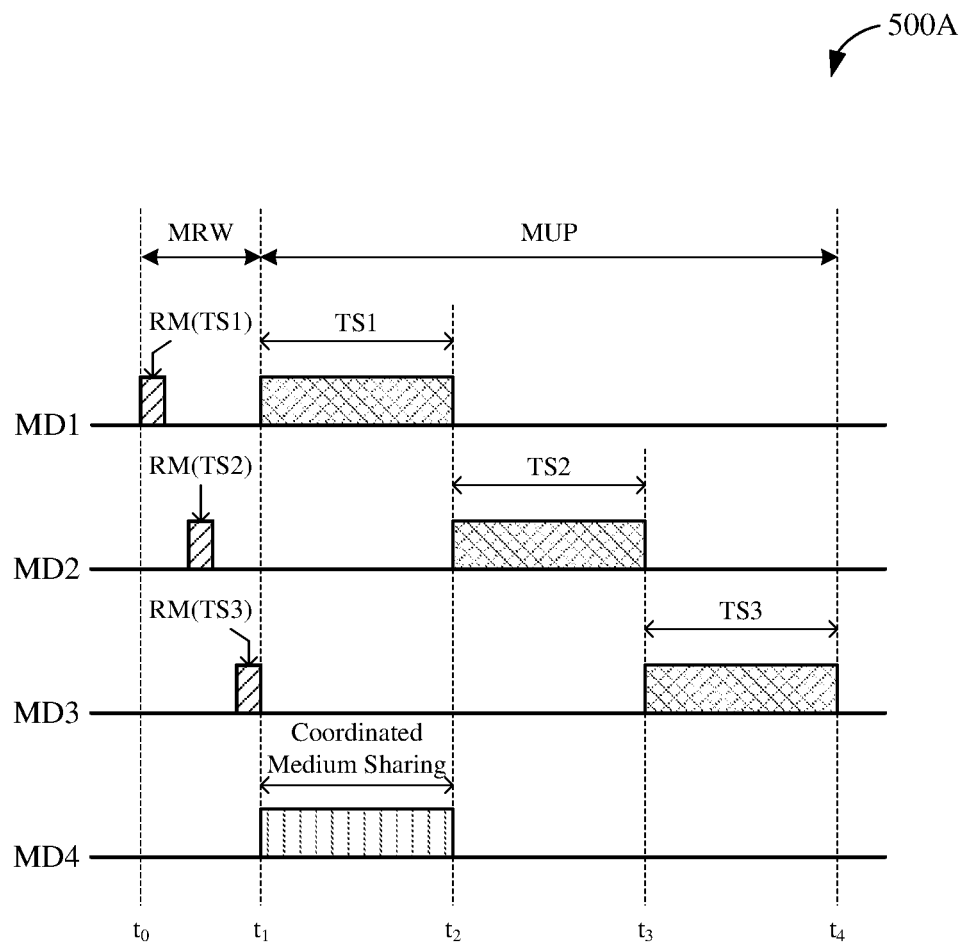
FIGS. 5A-5C show timing diagrams depicting example operations for sharing a medium access timeslot among multiple master devices.

FIG. 5A shows a timing diagram 500A depicting an example operation for sharing unused spatial streams (or dimensions) of a shared wireless medium during a medium access timeslot. In the example of FIG. 5A, a number of master devices MD1-MD4 may compete for access to a shared wireless medium (or frequency band). For example, each of the master devices MD1-MD4 may be located within relatively close proximity of one another (such as within wireless communication range). Each of the master devices MD1-MD4 may be an example implementation of master device 112 or master device 122 of FIG. 1. For simplicity, only four master devices MD1-MD4 are shown in the example of FIG. 5A. However, in actual implementations, there may be any number of master devices sharing the same wireless medium (or frequency band).

An MRW begins at time $t_0$. During the MRW, the master devices MD1-MD4 may contend for access to the shared wireless medium. For example, the first master device MD1 may broadcast a reservation message advertising a reservation of the shared wireless medium for the duration of a first timeslot TS1 (from times $t_1$ to $t_2$), the second master device MD2 may broadcast a reservation message advertising a reservation of the shared wireless medium for the duration of a second timeslot TS2 (from times $t_2$ to $t_3$), and the third master device MD3 may broadcast a reservation message advertising a reservation of the shared wireless medium for the duration of a third timeslot TS3 (from times $t_3$ to $t_4$). In the example of FIG. 5A, at least one of the MRW or the MUP may have a fixed duration. As a result, the fourth master device MD4 may be unable to gain access to the shared wireless medium during the upcoming MUP.

At the start of the MUP, at time $t_1$, the first master device MD1 may be granted exclusive access to the shared wireless medium for the duration of the first timeslot TS1. During the first timeslot TS1, from times $t_1$ to $t_2$, the first master device MD1 may service its associated client devices without interference from the remaining master devices MD2-MD4. In some implementations, the owner of a timeslot may allow another master device to utilize one or more unused spatial dimensions (or spatial streams) of the shared wireless medium during its reserved timeslot. For example, two or more master devices may belong to the same master device "cluster." In some implementations, master devices belonging to the same cluster may coordinate access to the shared wireless medium such that two or more master devices may share the wireless medium during a timeslot reserved for only one of the master devices in the cluster.

For example, depending on the number of antennas needed to service its associated STAs, the first master device MD1 may have a number of unused spatial dimensions (or spatial streams). In some aspects, the first master device MD1 may use coordinated multipoint (COMP) or Joint MIMO communication techniques to share its unused spatial dimensions with another master device in its cluster (such as the fourth master device MD4). For example, the first master device MD1 may use its remaining spatial dimensions to "null" the signals transmitted or received by the fourth master device MD4 so that they do not interfere with communications between the first master device MD1 and its associated client devices. In the example of FIG. 5A, the first master device MD1 may allow the fourth master device MD4 to communicate with its associated client devices using up to (but not exceeding) the number of unused spatial dimensions.

Upon termination of the first timeslot TS1, at time $t_2$, the second master device MD2 may be granted exclusive access to the shared wireless medium (or at least a portion thereof) for the duration of the second timeslot TS2. During the second timeslot TS2, from times $t_2$ to $t_3$, the second master device MD2 may service its associated client devices without interference from the remaining master devices MD1, MD3, or MD4. Upon termination of the second timeslot TS2, at time $t_3$, the third master device MD3 may be granted exclusive access to the shared wireless medium (or at least a portion thereof) for the duration of the third timeslot TS3. During the third timeslot TS3, from times $t_3$ to $t_4$, the third master device MD3 may service its associated client devices without interference from the remaining master devices MD1, MD2, or MD4. Thus, in the example of FIG. 5A, each of the master devices MD1-MD4 may be granted access the shared wireless medium even though only three master devices MD1-MD3 were able to reserve a timeslot within the MUP.

As described above, the first master device MD1 and fourth master device MD4 may belong to the same master device cluster. In some implementations, master devices that belong to the same cluster may take turns contending for the shared wireless medium during each MRW. For example, because a master device belonging to a master device cluster may share its timeslot with other master devices in the same cluster, it may be an inefficient allocation of resources to allow multiple master devices belonging to the same cluster to reserve individual timeslots within an MUP. In some aspects, once a master device belonging to a master device cluster successfully reserves a timeslot during an MRW, other master devices belonging to the same cluster may subsequently refrain from contending for access to the shared wireless medium during that MRW.

In some aspects, client devices that are associated with a master device belonging to a master device cluster may schedule their power saving states based on the availability of any master device belonging to the same cluster. For example, even though the fourth master device MD4 did not broadcast a reservation message during the MRW (from times $t_0$ to $t_1$), client devices associated with the fourth master device MD4 may nonetheless wake up (or remain awake) during any timeslot allocated for another master device belonging to the same cluster as the fourth master device MD4 (such as the first master device MD1). Thus, in the example of FIG. 5A, client devices associated with the fourth master device MD4 may wake up during the first timeslot TS1 (from times $t_1$ to $t_2$) with the expectation that the first master device MD1 could potentially share its reserved timeslot with the fourth master device MD4.

Figure 5B:
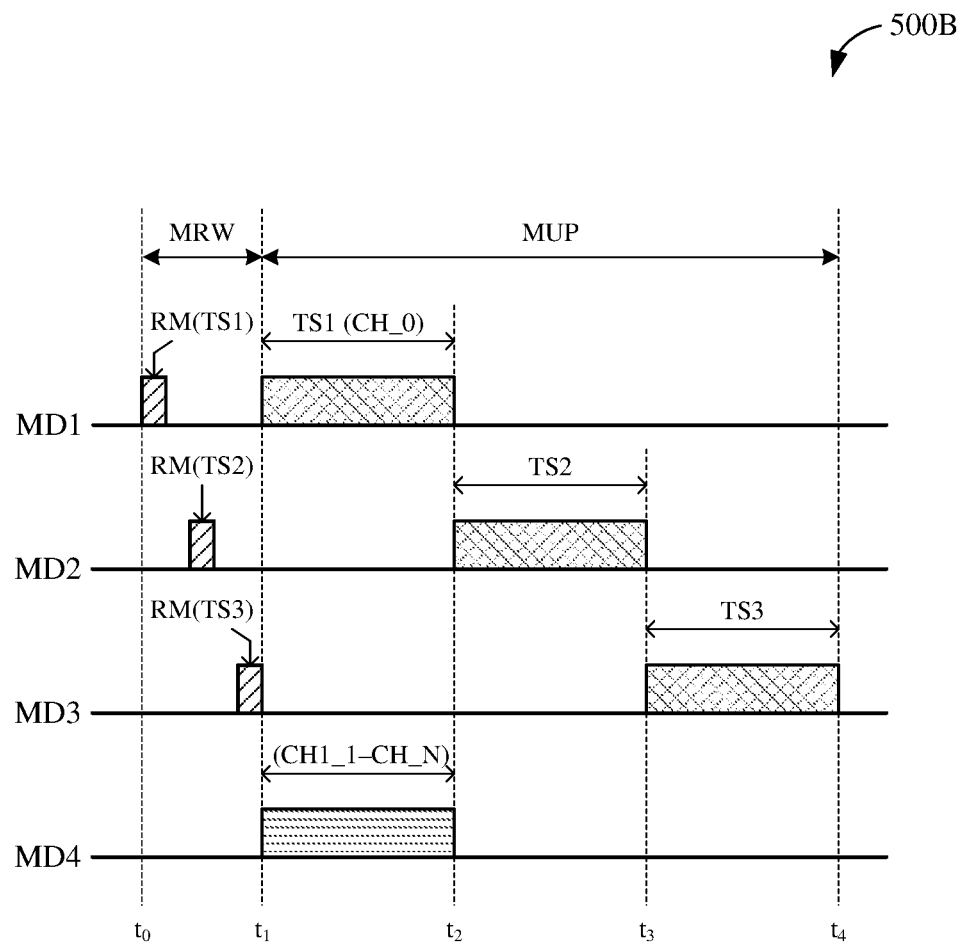

FIG. 5B shows a timing diagram 500B depicting an example operation for sharing unused channels of a shared wireless medium during a medium access timeslot. In the example of FIG. 5B, each of the master devices MD1-MD4 may be configured to reserve the shared wireless medium, in its entirety, for a given duration. For example, each of the master devices MD1-MD4 may listen to, and contend on, a single common channel of the shared frequency band. Each reservation message broadcast by the master devices MD1-MD4 may reserve the entire frequency band for the requested timeslot.

An MRW begins at time $t_0$. During the MRW, the master devices MD1-MD4 may contend for access to the shared wireless medium. For example, the first master device MD1 may broadcast a reservation message advertising a reservation of the shared wireless medium for the duration of a first timeslot TS1 (from times $t_1$ to $t_2$), the second master device MD2 may broadcast a reservation message advertising a reservation of the shared wireless medium for the duration of a second timeslot TS2 (from times $t_2$ to $t_3$), and the third master device MD3 may broadcast a reservation message advertising a reservation of the shared wireless medium for the duration of a third timeslot TS3 (from times $t_3$ to $t_4$). In the example of FIG. 5B, the fourth master device MD4 may be unable to gain access to the shared wireless medium during the upcoming MUP (due to the MRW or the MUP may have a fixed duration).

At the start of the MUP, at time $t_1$, the first master device MD1 may be granted exclusive access to the shared wireless medium for the duration of the first timeslot TS1. During the first timeslot TS1, from times $t_1$ to $t_2$, the first master device MD1 may service its associated client devices without interference from the remaining master devices MD2-MD4. In some implementations, the owner of a timeslot may allow another master device to utilize one or more unused channels of the shared wireless medium during its reserved timeslot. For example, while the entirety of the shared frequency band (CH_0-CH_N) may be reserved for the first master device MD1 during the first timeslot TS1, the first master device MD1 may require only a subset of channels (CH_0) of the shared frequency band to service its associated STAs. Thus, the first master device MD1 may advertise the availability of its unused channels (CH_1-CH_N) during a "quiet period" at the beginning of the first timeslot TS1. In some aspects, other master devices may contend for access to the unused channels (CH_1-CH_N) using contention-based channel access techniques (such as CSM/CA). In some other aspects, the owner of the timeslot (such as the first master device MD1) may arbitrate access to the unused channels (CH_1-CH_N) among the other master devices sharing the wireless medium. Still further, in some aspects, at least some of the unused channels may be reserved for onboarding new master devices to share the wireless medium (such as for communicating management information between master devices). In the example of FIG. 5B, the first master device MD1 may allow the fourth master device MD4 to communicate with its associated client devices during the first timeslot TS1 using one or more of the unused channels (CH_1-CH_N).

Upon termination of the first timeslot TS1, at time $t_2$, the second master device MD2 may be granted exclusive access to the shared wireless medium (or at least a portion thereof) for the duration of the second timeslot TS2. During the second timeslot TS2, from times $t_2$ to $t_3$, the second master device MD2 may service its associated client devices without interference from the remaining master devices MD1, MD3, or MD4. Upon termination of the second timeslot TS2, at time $t_3$, the third master device MD3 may be granted exclusive access to the shared wireless medium (or at least a portion thereof) for the duration of the third timeslot TS3. During the third timeslot TS3, from times $t_3$ to $t_4$, the third master device MD3 may service its associated client devices without interference from the remaining master devices MD1, MD2, or MD4. Thus, in the example of FIG. 5B, each of the master devices MD1-MD4 may be granted access the shared wireless medium even though only three master devices MD1-MD3 were able to reserve a timeslot within the MUP.

Figure 5C:
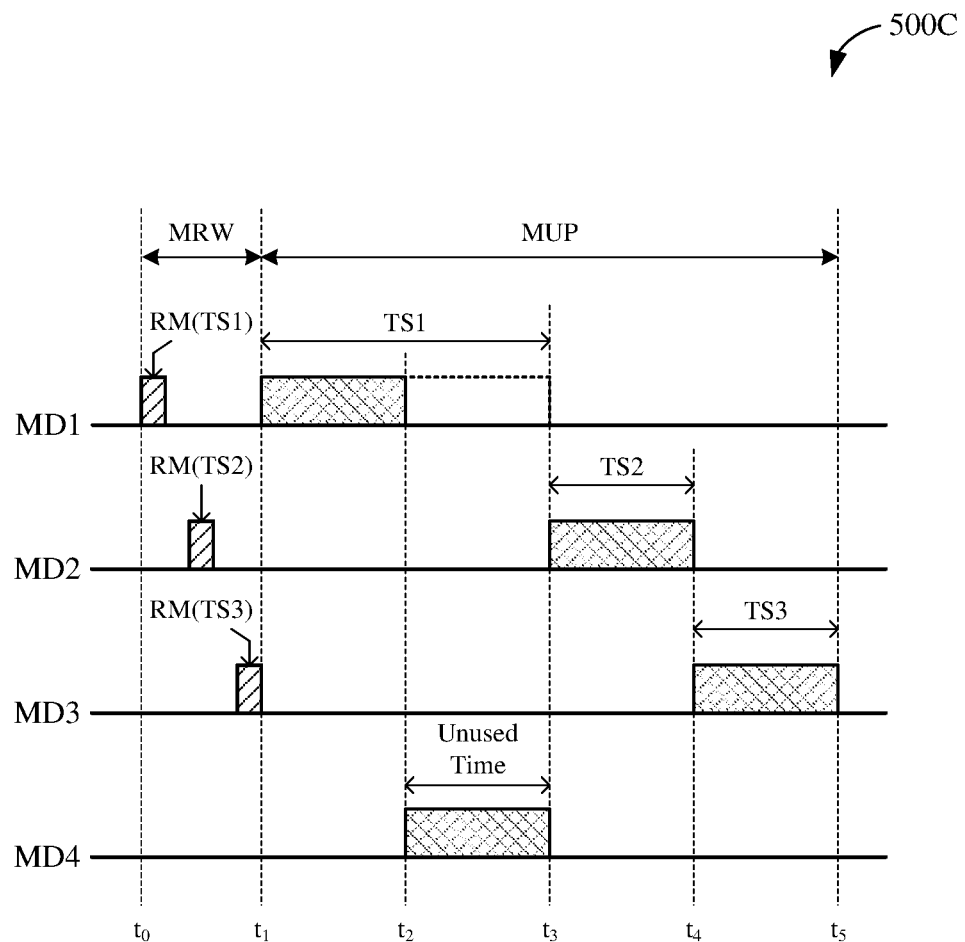

FIG. 5C shows a timing diagram 500C depicting an example operation for sharing an unused portion of a reserved timeslot. In some implementations, the master devices MD1-MD4 may listen to, and contend on, a single common channel of the shared frequency band (such as described with respect to FIG. 2A). In some other implementations, the master devices MD1-MD4 may contend for access to the shared wireless medium on a per-channel basis (such as described with respect to FIG. 2B).

An MRW begins at time $t_0$. During the MRW, the master devices MD1-MD4 may contend for access to the shared wireless medium. For example, the first master device MD1 may broadcast a reservation message advertising a reservation of the shared wireless medium for the duration of a first timeslot TS1 (from times $t_1$ to $t_3$), the second master device MD2 may broadcast a reservation message advertising a reservation of the shared wireless medium for the duration of a second timeslot TS2 (from times $t_3$ to $t_4$), and the third master device MD3 may broadcast a reservation message advertising a reservation of the shared wireless medium for the duration of a third timeslot TS3 (from times $t_4$ to $t_5$). In the example of FIG. 5C, the fourth master device MD4 may be unable to gain access to the shared wireless medium during the upcoming MUP (due to the MRW or the MUP having a fixed duration).

At the start of the MUP, at time $t_1$, the first master device MD1 may be granted exclusive access to the shared wireless medium for the duration of the first timeslot TS1. During the first timeslot TS1, from times $t_1$ to $t_3$, the first master device MD1 may service its associated client devices without interference from the remaining master devices MD2-MD4. In some implementations, the owner of a timeslot may allow another master device to utilize a portion of unused time during its reserved timeslot. For example, while the first master device MD1 may have reserved the first timeslot from times $t_1$ to $t_3$, the first master device MD1 may need only a portion of the reserved time to service its associated client devices (from times $t_1$ to $t_2$). Thus, the first master device MD1 may advertise the availability of the unused portion of its timeslot, at time $t_2$, after servicing its associated client devices. In some aspects, other master devices may contend for access to the wireless medium during the unused portion of the first timeslot TS1 using contention-based channel access techniques (such as CSM/CA). In some other aspects, the owner of the timeslot (such as the first master device MD1) may arbitrate access to the wireless medium during the unused portion of its timeslot. Still further, in some aspects, at least some of the unused portion of the first timeslot TS1 may be reserved for onboarding new master devices to share the wireless medium (such as for communicating management information between master devices). In the example of FIG. 5C, the first master device MD1 may allow the fourth master device MD4 to communicate with its associated client devices during the unused portion of the first timeslot TS1.

Upon termination of the first timeslot TS1, at time $t_3$, the second master device MD2 may be granted exclusive access to the shared wireless medium (or at least a portion thereof) for the duration of the second timeslot TS2. During the second timeslot TS2, from times $t_3$ to $t_4$, the second master device MD2 may service its associated client devices without interference from the remaining master devices MD1, MD3, or MD4. Upon termination of the second timeslot TS2, at time $t_4$, the third master device MD3 may be granted exclusive access to the shared wireless medium (or at least a portion thereof) for the duration of the third timeslot TS3. During the third timeslot TS3, from times $t_4$ to $t_5$, the third master device MD3 may service its associated client devices without interference from the remaining master devices MD1, MD2, or MD4. Thus, in the example of FIG. 5C, each of the master devices MD1-MD4 may be granted access the shared wireless medium even though only three master devices MD1-MD3 were able to reserve a timeslot within the MUP.

Figure 6:
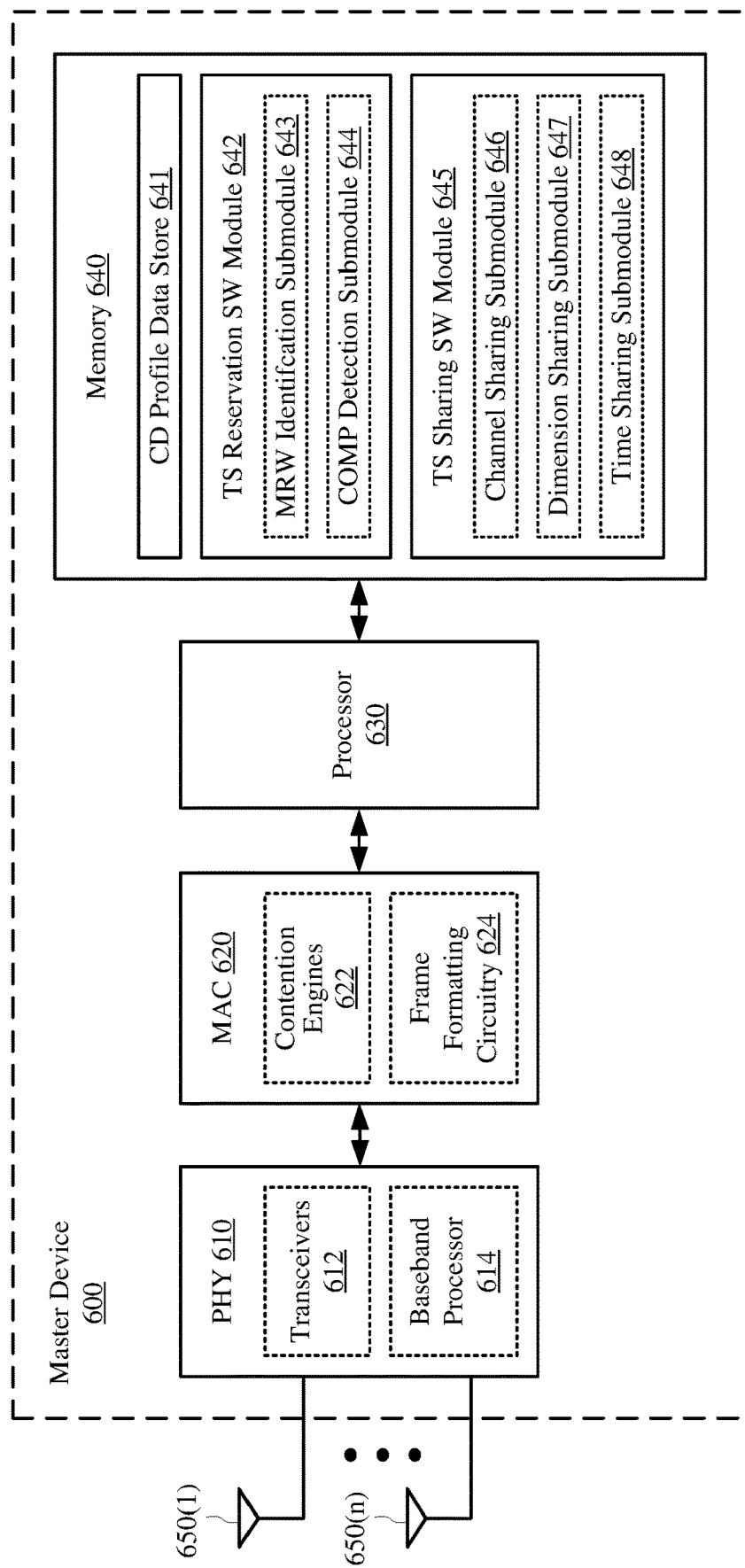
FIG. 6 shows a block diagram of an example master device.

FIG. 6 shows a block diagram of an example master device 600. For example, master device 600 may be an example implementation of any of the master devices 112 or 122 of FIG. 1, or master devices MD1-MD3 of FIGS. 2A and 2B, or master devices MD1-MD4 of FIGS. 3A-5C. The master device 600 may include a PHY 610, a MAC 620, a processor 630, a memory 640, and a number of antennas 650(1)-650(n).

The PHY 610 may include a number of transceivers 612 and a baseband processor 614. The transceivers 612 may be coupled to the antennas 650(1)-650(n), either directly or through an antenna selection circuit (not shown for simplicity). The transceivers 612 may be used to communicate wirelessly with one or more client devices, with one or more master devices, or with other suitable devices. The baseband processor 614 may be used to process signals received from the processor 630 or the memory 640 and to forward the processed signals to the transceivers 612 for transmission via one or more of the antennas 650(1)-650(n), and may be used to process signals received from one or more of the antennas 650(1)-650(n) via the transceivers 612 and to forward the processed signals to the processor 630 or the memory 640.

Although not shown in FIG. 6, for simplicity, the transceivers 612 may include any number of transmit chains to process and transmit signals to other wireless devices via the antennas 650(1)-650(n), and may include any number of receive chains to process signals received from the antennas 650(1)-650(n). Thus, in some implementations, the master device 600 may be configured for MIMO operations including, for example, single-user MIMO (SU-MIMO) operations and multi-user MIMO (MU-MIMO) operations. In addition, the master device 600 may be configured for OFDMA communications or other suitable multiple access mechanisms, for example, as may be specified by any of the IEEE 802.11 standards.

The MAC 620 may include at least a number of contention engines 622 and frame formatting circuitry 624. The contention engines 622 may contend for access to the shared wireless medium, and may store packets for transmission over the shared wireless medium. In some implementations, the contention engines 622 may be separate from the MAC 620. Still further, in some implementations, the contention engines 622 may be implemented as one or more software modules (stored in the memory 640 or in memory provided within the MAC 620). The frame formatting circuitry 624 may be used to create or format frames received from the processor 630 or the memory 640 (such as by adding MAC headers to PDUs provided by the processor 630), and may be used to re-format frames received from the PHY 610 (such as by stripping the MAC headers from frames received from the PHY 610).

The memory 640 may include a client device (CD) profile data store 641 that stores profile information for one or more client devices. The profile information for a particular client device may include, for example, its MAC address, supported data rates, connection history with the master device 600, one or more resource units (RUs) allocated to the client device, and any other suitable information pertaining to or describing the operation of the client device.

The memory 640 also may include a non-transitory computer-readable medium (one or more nonvolatile memory elements, such as EPROM, EEPROM, Flash memory, a hard drive, and the like) that may store at least the following software (SW) modules:

a timeslot (TS) reservation SW module 642 to reserve a shared wireless medium for a given timeslot within an upcoming medium utilization period (MUP), the TS reservation SW module 642 including:

a medium reservation window (MRW) identification submodule 643 to identify start and end times of MRWs in which to contend for access to the shared wireless medium; and a coordinated multipoint (COMP) detection submodule 644 to determine whether another master device belonging to the same master device cluster has already reserved a timeslot within the upcoming MUP, and to refrain from contending for access to the shared wireless medium during the current MRW upon determining that the other master device already has the timeslot reserved; and a TS sharing SW module 645 to share at least a portion of the wireless medium, during the reserved timeslot, with another master device, the TS sharing SW module 645 including:

a channel sharing submodule 646 to advertise an availability of one or more unused channels during a quiet period at the beginning of the reserved timeslot;

a dimension sharing submodule 647 to share one or more unused spatial dimensions (or spatial streams) with another master device belonging to the same master device cluster; and a time sharing submodule 648 to advertise an availability of an unused portion (or remaining duration) of the reserved timeslot after servicing its associated client devices.

Each software module includes instructions that, when executed by the processor 630, cause the master device 600 to perform the corresponding functions.

For example, the processor 630 may execute the TS reservation SW module 642 to reserve a shared wireless medium for a given timeslot within an upcoming MUP. In executing the TS reservation SW module 642, the processor 630 may further execute the MRW identification submodule 643 or the COMP detection submodule 644. For example, the processor 630 may execute the MRW identification submodule 643 to identify start and end times of MRWs in which to contend for access to the shared wireless medium. The processor 630 also may execute the COMP detection submodule 644 to determine whether another master device belonging to the same master device cluster has already reserved a timeslot within the upcoming MUP, and to refrain from contending for access to the shared wireless medium during the current MRW upon determining that the other master device already has the timeslot reserved.

The processor 630 may execute the TS sharing SW module 645 to share at least a portion of the wireless medium, during the reserve timeslot, with another master device. In executing the TS sharing SW module 645, the processor 630 may further execute the channel sharing submodule 646, the dimension sharing submodule 647, or the time sharing submodule 648. For example, the processor 630 may execute the channel sharing submodule 646 to advertise an availability of one or more unused channels during a quiet period at the beginning of the reserved timeslot. The processor 630 also may execute the dimension sharing submodule 647 to share one or more unused spatial dimensions (or spatial streams) with another master device belonging to the same master device cluster. Still further, the processor 630 may execute the time sharing submodule 648 to advertise an availability of an unused portion (or remaining duration) of the reserved timeslot after servicing its associated client devices.

Figure 7:
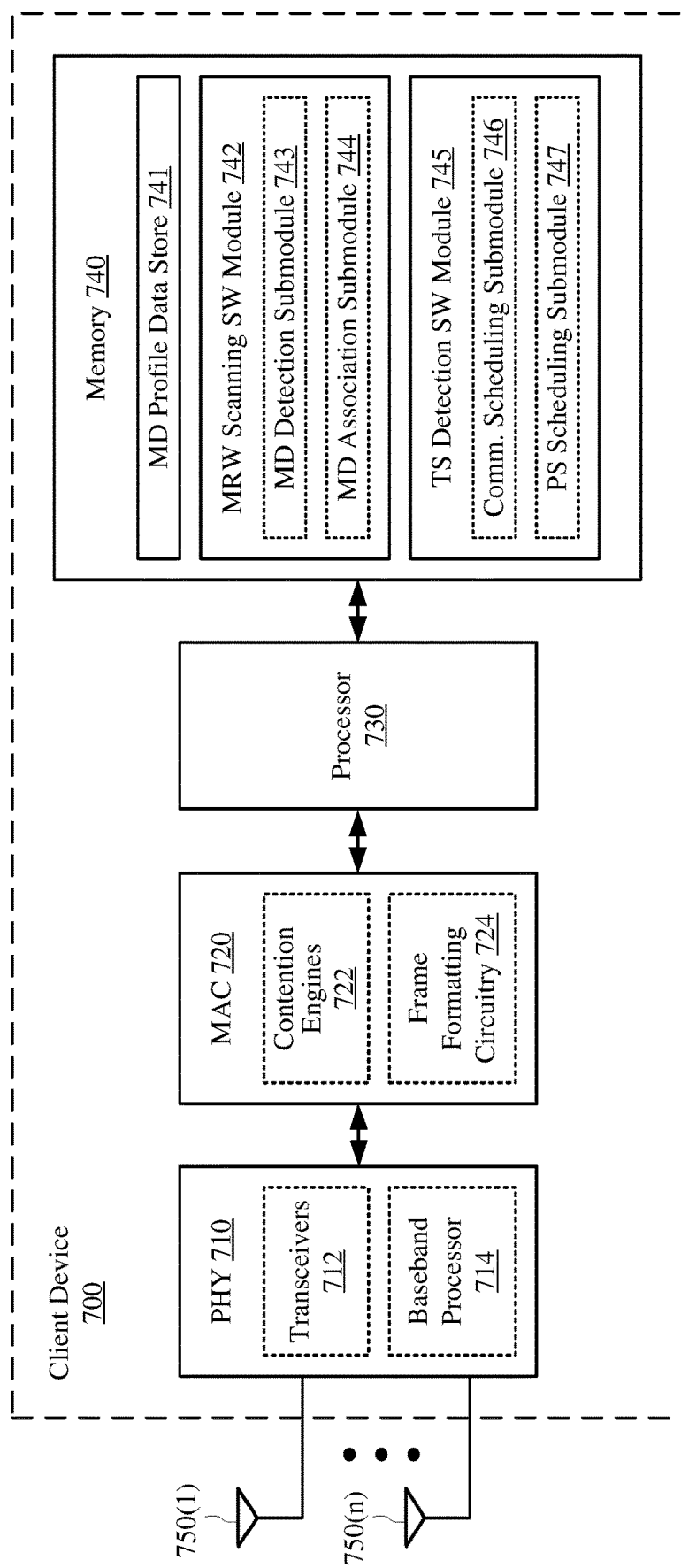
FIG. 7 shows a block diagram of an example client device.

FIG. 7 shows a block diagram of an example client device 700. For example, client device 700 may be an example implementation of any of the client devices CD1-CD6 depicted in FIG. 1. The client device 700 may include a PHY 710, a MAC 720, a processor 730, a memory 740, and a number of antennas 750(1)-750(n).

The PHY 710 may include a number of transceivers 712 and a baseband processor 714. The transceivers 712 may be coupled to the antennas 750(1)-750(n), either directly or through an antenna selection circuit (not shown for simplicity). The transceivers 712 may be used to communicate wirelessly with one or more master devices, with one or more client devices, or with other suitable devices. The baseband processor 714 may be used to process signals received from the processor 730 or the memory 740 and to forward the processed signals to the transceivers 712 for transmission via one or more of the antennas 750(1)-750(n), and may be used to process signals received from one or more of the antennas 750(1)-750(n) via the transceivers 712 and to forward the processed signals to the processor 730 or the memory 740.

Although not shown in FIG. 7, for simplicity, the transceivers 712 may include any number of transmit chains to process and transmit signals to other wireless devices via the antennas 750(1)-750(n), and may include any number of receive chains to process signals received from the antennas 750(1)-750(n). Thus, in some implementations, the client device 700 may be configured for MIMO operations including, for example, single-user MIMO (SU-MIMO) operations and multi-user MIMO (MU-MIMO) operations. In addition, the client device 700 may be configured for OFDMA communications or other suitable multiple access mechanisms, for example, as may be specified by any of the IEEE 802.11 standards.

The MAC 720 may include at least a number of contention engines 722 and frame formatting circuitry 724. The contention engines 722 may contend for access to the shared wireless medium, and may store packets for transmission over the shared wireless medium. In some implementations, the contention engines 722 may be separate from the MAC 720. Still further, in some implementations, the contention engines 722 may be implemented as one or more software modules (stored in the memory 740 or in memory provided within the MAC 720). The frame formatting circuitry 724 may be used to create or format frames received from the processor 730 or the memory 740 (such as by adding MAC headers to PDUs provided by the processor 730), and may be used to re-format frames received from the PHY 710 (such as by stripping the MAC headers from frames received from the PHY 710).

The memory 740 may include a master device (MD) profile data store 741 that stores profile information for one or more master devices. The profile information for a particular master device may include, for example, the BSSID, MAC address, channel information, received signal strength indicator (RSSI) values, goodput values, channel state information (CSI), supported data rates, connection history with the master device, a trustworthiness value of the master device (indicating a level of confidence about the master device's location or other properties associated with the master device), and any other suitable information pertaining to or describing the operation of the master device.

The memory 740 also may include a non-transitory computer-readable medium (one or more nonvolatile memory elements, such as EPROM, EEPROM, Flash memory, a hard drive, and the like) that may store at least the following software (SW) modules:
 a medium reservation window (MRW) scanning SW module 742 to scan (or listen to) one or more channels associated with an MRW to intercept medium reservation messages exchanged by one or more master devices contending for access to a shared wireless medium, the MRW sharing SW module 645 including:
  a master device (MD) detection submodule 743 to identify and detect one or more capabilities of the master devices based at least in part on the medium reservation messages intercepted during the MRW; and
  an MD association submodule 744 to selectively associate with one of the master devices based at least in part on the capabilities detected during the MRW; and
 a timeslot (TS) detection SW module 745 to identify reserved timeslots within an upcoming medium utilization period (MUP) based at least in part on medium reservation messages exchanged by one or more master devices during an MRW, the TS detection SW module 745 including:
  a communication scheduling submodule 746 to schedule communications with a selected master device, over the shared wireless medium, during a timeslot reserved by the selected master device; and
  a power save scheduling submodule 747 to schedule power save states for the client device 700 outside of the timeslot reserved by the selected master device.

Each software module includes instructions that, when executed by the processor 730, cause the client device 700 to perform the corresponding functions.

For example, the processor 730 may execute the MRW scanning SW module 742 to scan (or listen to) one or more channels associated with an MRW to intercept medium reservation messages exchanged by one or more master devices contending for access to a shared wireless medium. In executing the MRW scanning SW module 742, the processor 730 may further execute the MD detection submodule 743 or the MD association submodule 744. For example, the processor 730 may execute the MD detection submodule 743 to identify and detect one or more capabilities of the master devices based at least in part on the medium reservation messages intercepted during the MRW. The processor 730 also may execute the MD association submodule 744 to selectively associate with one of the master devices based at least in part on the capabilities detected during the MRW.

The processor 730 may execute the TS detection SW module 745 to identify reserved timeslots within an upcoming MUP based at least in part on medium reservation messages exchanged by one or more master devices during an MRW. In executing the TS detection SW module 745, the processor 730 may further execute the communication scheduling submodule 746 or the power save scheduling submodule 747. For example, the processor 730 may execute the communication scheduling submodule 746 to schedule communications with a selected master device, over the shared wireless medium, during a timeslot reserved by the selected master device. The processor 730 also may execute the power save scheduling submodule 747 to schedule power save states for the client device 700 outside of the timeslot reserved by the selected master device.

Figure 8:
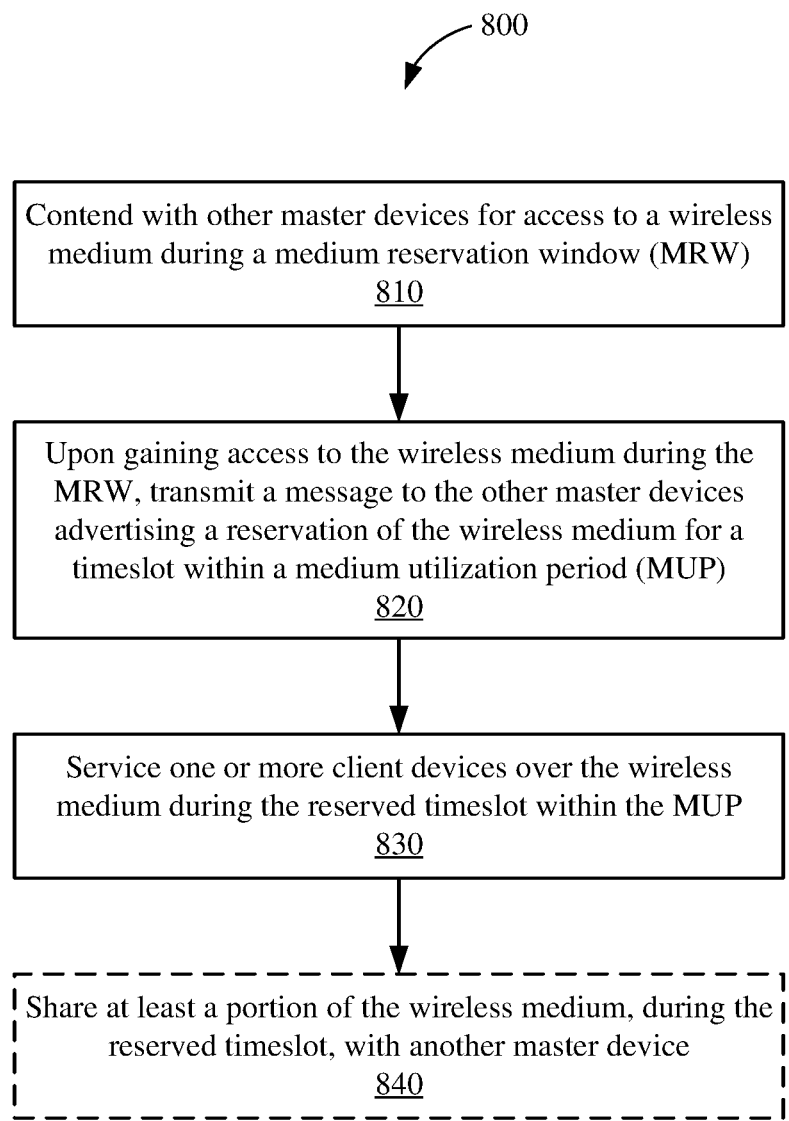
FIG. 8 shows a flowchart depicting an example operation for reserving a wireless medium shared by multiple master devices.

FIG. 8 shows a flowchart depicting an example operation 800 for reserving a wireless medium shared by multiple master devices. The operation 800 may be performed by a master device, including any of the master devices 112 or 122 of FIG. 1, or master devices MD1-MD3 of FIGS. 2A and 2B, or master devices MD1-MD4 of FIGS. 3A-5C.

The master device contends with other master devices for access to a wireless medium during a medium reservation window (810). In some aspects, the MRW may have a fixed duration. In some other aspects, the duration of the MRW may vary depending on the number of master devices contending for access to the wireless medium. During the MRW, the master device may use CSMA/CA techniques to listen to the wireless medium and wait a random back-off period before attempting to access or transmit on the wireless medium. In some implementations, only a relatively small subset of the available channels (of the shared frequency band) may be allocated for an MRW. For example, in some aspects, each master device may listen to, and contend on, a single common channel during the MRW. In some other aspects, master devices may contend on different channels of the shared frequency band.

Upon gaining access to the wireless medium during the MRW, the master device may transmit a message to the other master devices advertising a reservation of the wireless medium for a timeslot within a medium utilization period (820). Within a given timeslot, the master device may reserve the entirety of the frequency band, a subset of channels, a subset of spatial dimensions (or spatial streams), or any combination thereof. For example, the master device may broadcast a reservation message advertising the portion of the shared medium it wishes to reserve for the upcoming MUP. In some implementations, the reservation message may be formatted in a manner that can be understood by any master device (including Wi-Fi APs and cellular base stations). Further, in some implementations, the reservation message may include a bitmap indicating the timeslot to be reserved for the upcoming MUP. In some aspects, the MUP may have a fixed duration. In some other aspects, the duration of the MUP may vary depending on the channel access requirements of the master devices.

The master device may service one or more client devices over the wireless medium during the reserved timeslot within the MUP (830). For example, during the reserved timeslot, no other master devices (or their associated client devices) may access the shared wireless medium. Accordingly, the master device may service its associated client devices with little (or no) interference from other neighboring devices.

In some implementations, the master device may further share at least a portion of the wireless medium, during the reserved timeslot, with another master device (840). For example, if the master device reserves or uses only a subset of channels of the shared wireless medium, other master devices may access or reserve the unused channels during the master device's timeslot. Similarly, if the master device reserves or uses only a subset of its available spatial streams, other master devices (such as master devices belonging to the same master device cluster) may use or reserve up to the number of unused spatial streams or dimensions of the master device during its reserved timeslot. Still further, if the master device finishes servicing its client devices before the expiration of its reserved timeslot, other master devices may use or access the wireless medium for the remaining portion of the master device's timeslot.

Figure 9:
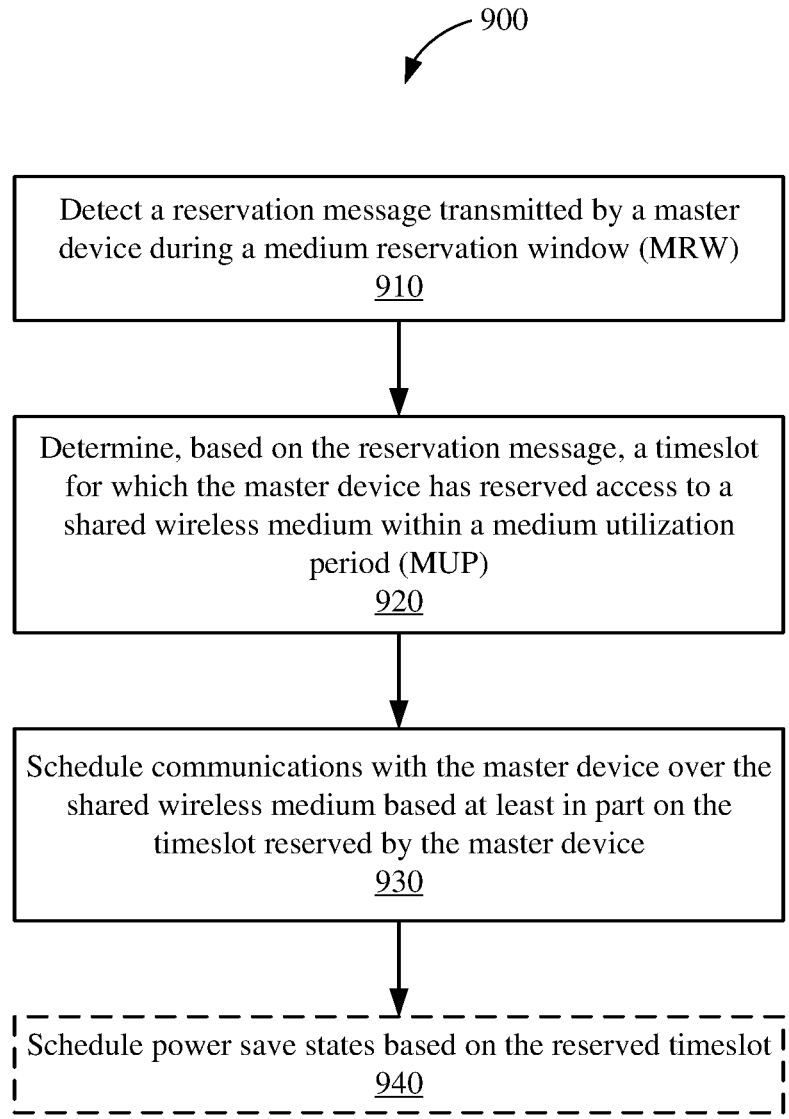
FIG. 9 shows a flowchart depicting an example operation for scheduling access to a wireless medium shared by multiple master devices.

FIG. 9 shows a flowchart depicting an example operation 900 for scheduling access to a wireless medium shared by multiple master devices. The operation 900 may be performed by a client device, including any of the client devices CD1-CD6 of FIG. 1.

The client device may detect a reservation message transmitted by a master device during a medium reservation window (910). For example, the client device may scan or listen to the common channel(s) associated with the MRW to intercept reservation messages transmitted or broadcast by master devices contending for access to a shared wireless medium. In some implementations, only a relatively small subset of available channels of the shared wireless medium may be allocated for the MRW. In some aspects, the client device may scan or listen to a single common channel associated with the MRW or a particular channel on which an associated master device is configured to operate. In some other aspects, client device may scan or listen to each channel associated with the MRW to identify and select a master device to associate with.

The client device may determine, based on the reservation message, a timeslot for which the master device has reserved access to a shared wireless medium within a medium utilization period (920). For example, each reservation message may advertise a timeslot, within the upcoming MUP, that a particular master device wishes to reserve. In some implementations, the reservation message may include a bitmap indicating the timeslot to be reserved for the upcoming MUP. Within a given timeslot, the master device may reserve the entirety of the frequency band, a subset of channels, a subset of spatial dimensions (or spatial streams), or any combination thereof. In some aspects, the client device may detect only the timeslot reserved by its associated master device. In some other aspects, the client device may detect the timeslots reserved by one or more non-associated master devices (such as to determine the overall duration of the MUP or the start of the next MRW).

The client device may schedule communications with the master device over the shared wireless medium based at least in part on the timeslot reserved by the master device (930). For example, during the reserved timeslot, no other master devices (or their associated client devices) may access the shared wireless medium. Accordingly, the client device may communicate with its associated master device with little (or no) interference from other neighboring devices.

In some implementations, the client device may further schedule one or more power save states based on the reserved timeslot (940). More specifically, the client device may schedule its power saving states around the available of its associated master device. Since the associated master device has access to the shared wireless medium only during its reserved timeslot, the client device may operate in a power save state for any period outside of the timeslot reserved by its associated master device (such as the remainder of the MUP).

In some implementations, client devices may be prohibited from unsolicited access to the wireless medium during the timeslot reserved by its master device. For example, any access to the shared wireless medium during a reserved timeslot may be scheduled by the master device that reserved the timeslot. Thus, client devices may not contend for access to the wireless medium during a reserved timeslot. In some aspects, a master device may disable any forms of unscheduled access (such as EDCA or CSMA/CA) to the reserved timeslot within an MUP as long as the master device operates as a collocated BSS (and unscheduled access is permitted on one of the other frequency bands in which the master device operates).

As used herein, a phrase referring to "at least one of" a list of items refers to any combination of those items, including single members. As an example, "at least one of: a, b, or c" is intended to cover: a, b, c, a-b, a-c, b-c, and a-b-c.

The term "client device," as used herein, also may refer to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a master device, comprising:
contending with other master devices for access to a wireless medium during a first medium reservation window (MRW);
determining a duration of the first MRW based at least in part on a number of master devices contending for access to the wireless medium during the first MRW;
upon gaining access to the wireless medium during the first MRW, transmitting a message to the other master devices advertising a reservation of the wireless medium for a timeslot within a first medium utilization period (MUP); and servicing one or more client devices over the wireless medium during the reserved timeslot within the first MUP.

2. The method of claim 1, wherein each of the master devices comprises a wireless access point or a cellular base station.

3. The method of claim 1, further comprising:
determining an availability of the wireless medium based on reservation messages transmitted by the other master devices during the first MRW; and
selecting the timeslot based on the availability of the wireless medium.

4. The method of claim 1, wherein at least one of the first MRW or the first MUP has a fixed duration.

5. A method performed by a master device, comprising:
contending with other master devices for access to a wireless medium during a first medium reservation window (MRW);
upon gaining access to the wireless medium during the first MRW, transmitting a message to the other master devices advertising a reservation of the wireless medium for a timeslot within a first medium utilization period (MUP);
determining a duration of the first MUP based at least in part on a medium access requirement of each master device that reserves a timeslot within the first MUP; and
servicing one or more devices over the wireless medium during the reserved timeslot within the first MUP.

6. The method of claim 1, wherein the reservation is for a number of channels, a number of spatial dimensions, a duration of time, or any combination thereof.

7. The method of claim 1, further comprising:
sharing at least a portion of the wireless medium, during the reserved timeslot, with another master device.

8. The method of claim 7, wherein the shared portion of the wireless medium includes a number of unused channels, a number of unused spatial dimensions, an unused duration of time, or a combination thereof.

9. The method of claim 8, wherein the sharing comprises:
advertising an availability of the shared portion of the wireless medium at the start of the reserved timeslot.

10. The method of claim 8, wherein the sharing comprises:
advertising an availability of the shared portion of the wireless medium after servicing the one or more client devices.

11. The method of claim 8, wherein the master device and the other master device belong to the same master device cluster.

12. The method of claim 11, further comprising:
determining, during a second MRW, that the other master device has reserved the wireless medium for a timeslot within a second MUP;
refraining from contending for access to the wireless medium during the second MRW upon determining that the other master device has reserved the wireless medium; and
coordinating access to the wireless medium with the other master device during the timeslot reserved by the other master device within the second MUP.

13. A master device, comprising:
one or more processors; and
a memory storing instructions that, when executed by the one or more processors, cause the master device to:
contend with other master devices for access to a wireless medium during a first medium reservation window (MRW);
upon gaining access to the wireless medium during the first MRW, transmit a message to the other master devices advertising a reservation of the wireless medium for a timeslot within a first medium utilization period (MUP);
determine a duration of the first MUP based at least in part on a medium access requirement of each master device that reserves a timeslot within the first MUP; and
service one or more client devices over the wireless medium during the reserved timeslot within the first MUP.

14. The master device of claim 13, wherein execution of the instructions further causes the master device to:
determine an availability of the wireless medium based on reservation messages transmitted by the other master devices during the first MRW; and
select the timeslot based on the availability of the wireless medium.

15. The master device of claim 13, wherein at least one of the first MRW or the first MUP has a fixed duration.

16. A master device, comprising:
one or more processors; and
a memory storing instructions that, when executed by the one or more processors, cause the master device to:
contend with other master devices for access to a wireless medium during a first medium reservation window (MRW);
determine a duration of the first MRW based at least in part on a number of master devices contending for access to the wireless medium during the first MRW;
upon gaining access to the wireless medium during the first MRW, transmit a message to the other master devices advertising a reservation of the wireless medium for a timeslot within a first medium utilization period (MUP); and
service one or more client devices over the wireless medium during the reserved timeslot within the first MUP.

17. The master device of claim 13, wherein the reservation is for a number of channels, a number of spatial dimensions, a duration of time, or any combination thereof.

18. The master device of claim 13, wherein execution of the instructions further causes the master device to:
share at least a portion of the wireless medium, during the reserved timeslot, with another master device, wherein the shared portion of the wireless medium includes a number of unused channels, a number of unused spatial dimensions, an unused duration of time, or a combination thereof.

19. The master device of claim 18, wherein the master device and the other master device belong to the same master device cluster.

20. The master device of claim 19, wherein execution of the instructions further causes the master device to:
determine, during a second MRW, that the other master device has reserved the wireless medium for a timeslot within a second MUP;

refrain from contending for access to the wireless medium during the second MRW upon determining that the other master device has reserved the wireless medium; and coordinate access to the wireless medium with the other master device during the timeslot reserved by the other master device within the second MUP.

21. A method performed by a client device, comprising:
detecting, during a medium reservation window (MRW), a reservation message transmitted by a master device, wherein the duration of the MRW is based at least in part on a number of master devices contending for access to a shared wireless medium;
scanning a subset of channels allocated for the MRW, wherein the subset of channels is less than a number of channels available on the shared wireless medium;
determining, based on the reservation message, a timeslot for which the master device has reserved access to the shared wireless medium within a medium utilization period (MUP); and
scheduling communications with the master device over the shared wireless medium based at least in part on the timeslot reserved by the master device.

22. The method of claim 21, wherein the scheduling comprises:
communicating with the master device over the shared wireless medium during the timeslot reserved by the master device; and
operating in a power save state during the remainder of the MUP.

23. The method of claim 21, wherein the reservation message includes information indicating one or more capabilities of the master device, the method further comprising:
associating with the master device based at least in part on the information included in the reservation message.

24. A client device, comprising:
one or more processors; and
a memory storing instructions that, when executed by the one or more processors, cause the client device to:
detect a reservation message transmitted by a master device during a medium reservation window (MRW), wherein the duration of the MRW is based at least in part on a number of master devices contending for access to a shared wireless medium;
scan a subset of channels allocated for the MRW, wherein the subset of channels is less than a number of channels available on the shared wireless medium;
determine, based on the reservation message, a timeslot for which the master device has reserved access to the shared wireless medium within a medium utilization period (MUP); and
schedule communications with the master device over the shared wireless medium based at least in part on the timeslot reserved by the master device.

25. The client device of claim 24, wherein execution of the instructions for scheduling communications with the master device causes the client device to:
communicate with the master device over the shared wireless medium during the timeslot reserved by the master device; and
operate in a power save state for the remainder of the MUP.

26. The client device of claim 24, wherein the reservation message includes information indicating one or more capabilities of the master device, and wherein execution of the instructions further causes the client device to:
associate with the master device based at least in part on the information included in the reservation message.

* * * * *